(12) United States Patent
Handa

(10) Patent No.: US 7,676,341 B2
(45) Date of Patent: Mar. 9, 2010

(54) MAGNETIC SENSOR CONTROL DEVICE

(75) Inventor: Ibuki Handa, Hamamatsu (JP)

(73) Assignee: Yamaha Corporation, Shizuoka-Ken (JP)

( * ) Notice: Subject to any disclaimer, the term of this patent is extended or adjusted under 35 U.S.C. 154(b) by 0 days.

(21) Appl. No.: 12/163,683

(22) Filed: Jun. 27, 2008

(65) Prior Publication Data

US 2008/0266695 A1 Oct. 30, 2008

Related U.S. Application Data

(62) Division of application No. 11/548,022, filed on Oct. 10, 2006, now Pat. No. 7,418,359.

(30) Foreign Application Priority Data

| Oct. 11, 2005 | (JP) | ............................. 2005-296610 |
| Nov. 22, 2005 | (JP) | ............................. 2005-337412 |
| Feb. 2, 2006 | (JP) | ............................. 2006-026260 |

(51) Int. Cl.
*G01C 19/00* (2006.01)
*G01R 33/00* (2006.01)
*G01C 17/00* (2006.01)

(52) U.S. Cl. ...................... 702/104; 324/260; 33/355 R

(58) Field of Classification Search ................. 702/104, 702/84–85, 89, 92, 94–95, 57, 81, 97, 107, 702/127, 150–153, 155, 157–158, 182–183, 702/189, 196, 87; 324/200, 202, 207.11, 324/207.12, 226, 244, 260; 33/355 R, 356, 33/357; 701/224; 73/1.41

See application file for complete search history.

(56) References Cited

U.S. PATENT DOCUMENTS

| 4,660,161 | A | 4/1987 | Okada et al. |
| 5,165,269 | A | 11/1992 | Nguyen |
| 5,878,370 | A | 3/1999 | Olson |
| 6,401,036 | B1 | 6/2002 | Geier et al. |
| 6,445,178 | B1 | 9/2002 | Hoekstra |
| 6,643,941 | B2 | 11/2003 | Parks et al. |
| 6,922,647 | B2 | 7/2005 | Cho et al. |
| 6,928,366 | B2 * | 8/2005 | Ockerse et al. ............... 701/224 |
| 7,119,533 | B2 * | 10/2006 | Tamura et al. ............... 324/202 |

(Continued)

FOREIGN PATENT DOCUMENTS

EP    1 519 148 A1    3/2005

(Continued)

OTHER PUBLICATIONS

Korean Office Action/Report, Oct. 25, 2007.

*Primary Examiner*—Michael P. Nghiem
*Assistant Examiner*—Toan M Le
(74) *Attorney, Agent, or Firm*—Dickstein Shapiro LLP

(57) ABSTRACT

A magnetic sensor control device has an input section, a selection section, a calculation section, and a setting section. The input section inputs a plurality of magnetic data each having 3 components sequentially output from a 3-dimensional (3D) magnetic sensor. The selection section selects 4 magnetic data satisfying a predetermined 4-point selection condition from the plurality of the input magnetic data. The calculation section calculates a center point equally distant from 4 points corresponding to the 4 selected magnetic data. The setting section sets 3 components representing the center point as an offset of the magnetic data.

20 Claims, 17 Drawing Sheets

U.S. PATENT DOCUMENTS 7,210,236 B2 * 5/2007 Sato et al .................. 33/356
7,275,008 B2 * 9/2007 Plyvanainen ................ 702/92

FOREIGN PATENT DOCUMENTS

| EP | 1 643 212 A1 | 4/2006 |
| WO | WO-2004/003476 A1 | 1/2004 |
| WO | WO-2005/003683 A1 | 1/2005 |
| WO | WO-2006/035505 A1 | 4/2006 |

* cited by examiner

| p0 | p2 | p1 |
|---|---|---|
| END1 | INTERMEDIATE | END2 |
| 1 | 4 | 5 |

| p0 | p2 | p1 |
|---|---|---|
| END1 | INTERMEDIATE | END2 |
| 6 | 4 | 5 |

BUFFER

| p0 END1 | p2 INTERMEDIATE | p1 END2 |
|---|---|---|
| 1 | 4 | 5 |

| p0 END1 | p2 INTERMEDIATE | p1 END2 |
|---|---|---|
| 6 | 4 | 5 |

FIG. 20

| ANGLE | E_A |
|---|---|
| 10 | 0.000635426 |
| 15 | 0.00143198 |
| 20 | 0.00255142 |
| 25 | 0.00399805 |
| 30 | 0.00577746 |
| 35 | 0.00789658 |
| 40 | 0.0103637 |
| 45 | 0.0131887 |
| 50 | 0.0163828 |
| 55 | 0.0199591 |
| 60 | 0.0239323 |
| 65 | 0.0283189 |
| 70 | 0.0331378 |
| 75 | 0.0384097 |
| 80 | 0.0441581 |
| 85 | 0.0504089 |
| 90 | 0.057191 |
| 95 | 0.0645364 |
| 100 | 0.0724809 |
| 105 | 0.0810641 |
| 110 | 0.09033 |
| 115 | 0.100328 |
| 120 | 0.111111 |
| 125 | 0.122741 |
| 130 | 0.135286 |
| 135 | 0.148821 |
| 140 | 0.16343 |
| 145 | 0.179209 |
| 150 | 0.196264 |
| 155 | 0.214714 |
| 160 | 0.234696 |
| 165 | 0.256363 |
| 170 | 0.279888 |
| 175 | 0.305469 |
| 180 | 0.333333 |

MAGNETIC SENSOR CONTROL DEVICE

CROSS-REFERENCE TO RELATED APPLICATIONS

The present application is a divisional of U.S. application Ser. No. 11/548,022, filed Oct. 10, 2006, now U.S. Pat. No. 7,418,359, which claims the benefit of Japanese Application Nos. 2005-296610, filed on Oct. 11, 2005; 2005-337412, filed on Nov. 22, 2005; and 2006-026260, filed Feb. 2, 2006, the disclosures of which are herewith incorporated by reference in their entirety.

BACKGROUND OF THE INVENTION

1. Technical Field of the Invention

The present invention relates to a magnetic sensor control device, method, and program.

2. Description of the Related Art

In a first aspect, a conventional 3-dimensional (3D) magnetic sensor mounted on a moving body detects the direction of an Earth's magnetic field (geomagnetism). The 3D magnetic sensor generally includes 3 magnetic sensor modules to detect scalar components of the magnetic field vector in 3 orthogonal directions. Magnetic data output from the 3D magnetic sensor has 3 components since the magnetic data consists of a combination of outputs of the 3 magnetic sensor modules. The direction and magnitude of a vector having components corresponding to the magnetic data corresponds to the direction and magnitude of a magnetic field detected by the 3D magnetic sensor. When specifying the direction or magnitude of an Earth's magnetic field based on outputs of the 3D magnetic sensor, it is necessary to perform a process for correcting the outputs of the 3D magnetic sensor in order to negate magnetization components of the moving body. A control value of this correction process is referred to as an offset. The offset indicates the vector of a magnetic field caused by the magnetization components of the moving body detected by the 3D magnetic sensor. The magnetization components are negated by subtracting the offset from the magnetic data output from the 3D magnetic sensor. It is possible to calculate the offset by obtaining the center of a spherical surface passing through points represented by components corresponding to the magnetic data.

However, practically, a set of points corresponding to magnetic data do not form a perfect sphere. The reasons are that outputs of the 3D magnetic sensor inherently have measurement errors following Gaussian distribution, a magnetic field measured by the 3D magnetic sensor varies during a period in which magnetic data required to calculate the offset is stored since in practice there is no completely uniform magnetic field, and calculation errors occur until digital values are obtained from the outputs of the 3D magnetic sensor.

A conventional method for calculating a magnetic sensor offset stores a large number of magnetic data and calculates the most probable offset through a statistical process of the stored magnetic data (for example, see International Publication No. 2004-003476). However, when the statistical process of a large number of magnetic data is performed, a highly accurate offset cannot be calculated unless a magnetic data group as a statistical population is distributed evenly over a wide range and a peculiar magnetic data is excluded from the statistical population. Accordingly, to calculate a highly accurate offset, it is necessary to select a statistical population and, ultimately, it is not possible to calculate a highly accurate offset only by the statistical process. It also requires a very large amount of processing, a long time, and high resource consumption to calculate the most probable center of a spherical surface through the statistical process.

In a second aspect, a conventional 2-dimensional (2D) magnetic sensor mounted on a moving body detects the direction of the Earth's magnetic field. The 2D magnetic sensor generally includes 2 magnetic sensor modules to detect scalar components of the magnetic field vector in 2 orthogonal directions. Magnetic data output from the 2D magnetic sensor has 2 components since the magnetic data consists of a combination of outputs of the 2 magnetic sensor modules. The direction and magnitude of a vector having components corresponding to the magnetic data corresponds to the direction and magnitude of a magnetic field detected by the 2D magnetic sensor. When specifying the direction or magnitude of the Earth's magnetic field based on outputs of the 2D magnetic sensor, the outputs include magnetization components of the moving body and inherent measurement errors of the magnetic sensor. To negate the magnetization components and measurement errors, it is necessary to perform a process for correcting the outputs of the 2D magnetic sensor. A control value of this correction process is also referred to as an offset likewise the case of 3D magnetic sensor. The offset indicates the vector of a magnetic field caused by the magnetization components of the moving body detected by the 2D magnetic sensor, which includes the measurement errors of the magnetic sensor. The magnetization components and the measurement errors of the magnetic sensor are collectively negated by subtracting the offset from the magnetic data output from the 2D magnetic sensor. It is possible to calculate the offset by obtaining the center of a circle passing through points corresponding to the magnetic data. A process for obtaining the offset is referred to as calibration.

However, practically, a set of points corresponding to magnetic data do not form a perfect circle. The reasons are that outputs of the 2D magnetic sensor inherently have measurement errors following Gaussian distribution, a magnetic field measured by the 2D magnetic sensor varies during a period in which magnetic data required to calculate the offset is stored since in practice there is no completely uniform magnetic field, and calculation errors occur until digital values are obtained from the outputs of the 2D magnetic sensor.

A conventional method for calculating a magnetic sensor offset stores a large number of magnetic data and calculates the most probable offset through a statistical process of the stored magnetic data (for example, see International Publication No. 2004-003476). However, when the statistical process of a large number of magnetic data is performed, a highly accurate offset cannot be calculated unless a statistical population of magnetic data is distributed evenly over a wide range and a peculiar magnetic data is excluded from the statistical population. Accordingly, to calculate a highly accurate offset, it is necessary to select a statistical population and, ultimately, it is not possible to calculate a highly accurate offset only by the statistical process. It also requires a very large amount of processing, a long time, and high resource consumption to calculate the most probable center of a spherical surface through the statistical process.

SUMMARY OF THE INVENTION

It is an object of the present invention to provide a magnetic sensor control device, method, and program, wherein there is no need to use a statistical process in offset calculation.

In order to achieve the object, a first aspect of the present invention provides a magnetic sensor control device comprising an input section for inputting a plurality of magnetic data having 3 components sequentially output from a 3-dimensional (3D) magnetic sensor; a selection section for selecting 4 magnetic data satisfying a predetermined 4-point selection condition from the plurality of the input magnetic data; a calculation section for calculating a center point equally distant from 4 points each represented by 3 components of a corresponding one of the 4 selected magnetic data; and a setting section for setting 3 components of the center point as an offset of the magnetic data.

Since 4 magnetic data satisfying a predetermined 4-point selection condition is selected from a plurality of magnetic data output sequentially from the 3D magnetic sensor, and a center point equally distant from 4 points corresponding to the 4 selected magnetic data is calculated, there is no need to use a statistical process in calculating the offset so that the offset can be calculated efficiently. The reliability of the calculated offset may be estimated using a statistical process.

The magnetic sensor control device may further comprise a buffer for storing the plurality of the input magnetic data. The selection section may select n−1th magnetic data satisfying a predetermined selection condition before selecting nth (2nd, 3rd, or 4th) magnetic data, then obtain magnetic data, which has not been selected as any of up to the n−1th magnetic data, from the buffer, and set the obtained magnetic data as a candidate for selection of the nth magnetic data.

To ensure that 4 magnetic data satisfying the 4-point selection condition is selected from a plurality of magnetic data with one attempt, a large number of selections may be required and a large maximum amount of processing may be required for the selection. Thus, the selection condition is set in a stepwise manner and, before nth magnetic data is selected according to one condition, n−1th magnetic data is selected according to another condition, thereby reducing the maximum amount of processing required for the selection. In addition, when the nth magnetic data is selected according to one condition, magnetic data which has not been selected as any of up to the n−1th magnetic data is used again as a candidate for selection, thereby reducing the number of magnetic data required to calculate the offset. This reduces the number of manipulations of a moving body containing the 3D magnetic sensor, required to collect magnetic data to calculate the magnetic data offset and shortens the time required to calculate the offset.

While storing the input magnetic data in 3 data structures provided to store 3 magnetic data as candidates for selection, the selection section may update the 3 data structures until the 3 magnetic data stored in the 3 data structures satisfies a predetermined 3-point selection condition.

Since selection of up to the 3rd magnetic data is completed before the 4th magnetic data satisfying the 4-point selection condition is selected, it is possible to reduce the maximum amount of processing required for the selection. In a procedure in which the 3rd magnetic data is selected, it is possible to use 3 data structures that can store 3 magnetic data that are updated one by one. A data structure for storing magnetic data can be defined, for example, as a sequence of 3 variables for storing 3 components of magnetic data.

When last input magnetic data is stored in one of the 3 data structures, the selection section may select the one data structure, and update the selected data structure with the last input magnetic data, provided that the length of a chord of a circular arc passing through 3 points having components corresponding to the 3 magnetic data stored in the 3 data structures is increased or at least is not decreased by updating the one data structure with the last input magnetic data.

A circle passing through 3 points having components corresponding to 3 magnetic data corresponds to the circumference of a truncation of a sphere centered at a point having components corresponding to the finally obtained offset. To allow the truncation to approach a true truncation of a sphere centered at a point having components corresponding to the correct offset, it is preferable that the area of the truncation of the sphere be increased and 3 points defining the truncation of the sphere be distributed evenly over a wide range along the circumference. Accordingly, it is preferable that the length of a chord passing through 3 points corresponding to 3 magnetic data be large. Thus, it is preferable that, when last input magnetic data is stored in one of the 3 data structures, the data structure to be updated be selected such that the length of a chord of a circular arc passing through 3 points corresponding to 3 magnetic data stored in the 3 data structures is increased by updating the data structure.

The selection section may reset the 3 data structures when the number of times the 3 data structures have been updated exceeds a predetermined number of times.

If a magnetic field in which the magnetic sensor is present is rapidly changed after up to the second magnetic data is selected during a procedure for selecting 3 magnetic data satisfying the 3-point selection condition, there is a possibility that third magnetic data satisfying the 3-point selection condition will never be input. To prevent this problem, it is preferable that the 3 data structures be reset when the number of times the 3 data structures have been updated exceeds a predetermined number of times. As a result, magnetic data associated with a magnetic field after the change is stored in the 3 empty data structures, thereby avoiding the problem that 3 magnetic data satisfying the 3-point selection condition will never be selected.

The 3-point selection condition may include a condition associated with the distortion of a triangle having vertices corresponding to 3 points each represented by 3 components of a corresponding one of the 3 magnetic data stored in the data structures from a regular triangle.

A circle passing through 3 points corresponding to 3 magnetic data corresponds to the circumference of a truncation of a sphere centered at a point represented by 3 components corresponding to the finally obtained offset. To allow the truncation to approach a true truncation of a sphere centered at a point corresponding to the correct offset, it is preferable that 3 points defining the truncation of the sphere be distributed at regular intervals along the circumference. Accordingly, it is preferable to set a 3-point selection condition associated with the distortion of a triangle having vertices corresponding to 3 points each represented by 3 components of a corresponding one of 3 magnetic data from a regular triangle. When a triangle having vertices corresponding to 3 points having components corresponding to 3 magnetic data is a regular triangle, the 3 points are distributed at regular intervals along the circumference.

The distortion of the triangle from the regular triangle can be defined based on some properties of triangles.

For example, the 3-point selection condition may include a condition that variation between inner angles of the triangle is within a predetermine range. In addition, for example, the 3-point selection condition may include a condition that variation between lengths of sides of the triangle is within a predetermined range. Further, for example, the 3-point selection condition may include a condition that variation between distances of vertices of the triangle from a centroid of the triangle is within a predetermined range.

Although such a parameter of the variation can be properly defined mathematically, it is preferable that the variation be defined taking into consideration the amount of calculation or the processing time required for determination about the condition or the possibility of reuse of a calculation result obtained during the condition determination process.

Accordingly, it is preferable that the 3-point selection condition include a condition that the ratio of an intermediate eigenvalue of a symmetric matrix A of 3 rows and 3 columns expressed as follows to a maximum eigenvalue of the symmetric matrix A be equal to or higher than a predetermined value:

$$A = \sum_{i=0}^{2}(p_i - d_3)(p_i - d_3)^T,$$

where $p_i$ (i=0, 1, 2) denotes each vertex of the triangle and $d_3$ denotes a centroid of the triangle.

The 4-point selection condition may include a condition associated with the distortion of a tetrahedron having vertices corresponding to 4 points each represented by 3 components of a corresponding one of 4 magnetic data.

4 points corresponding to 4 magnetic data define a spherical surface centered at a point corresponding to the finally obtained offset. To allow the defined spherical surface to approach a true spherical surface centered at a point corresponding to the correct offset, it is preferable that 4 points defining the spherical surface be distributed evenly over a wide range on the spherical surface. When 4 points defining the spherical surface are distributed evenly over a wide range on the spherical surface, a tetrahedron having vertices corresponding to the 4 points is a regular tetrahedron. Accordingly, it is preferable to set a 4-point selection condition associated with the distortion of a tetrahedron having vertices corresponding to 4 points each represented by 3 components of a corresponding one of 4 magnetic data as candidates for selection from a regular tetrahedron.

The distortion of the tetrahedron from the regular tetrahedron can be defined based on some properties of tetrahedrons.

For example, the 4-point selection condition may include a condition that variation between solid angles of the tetrahedron is within a predetermined range. In addition, for example, the 4-point selection condition may include a condition that variation between areas of surfaces of the tetrahedron is within a predetermined range. Further, for example, the 4-point selection condition may include a condition that variation between distances of vertices of the tetrahedron from a centroid of the tetrahedron is within a predetermined range.

As described above, although the variation between values can be properly defined mathematically, it is preferable that the variation be defined taking into consideration the amount of calculation or the processing time required for determination about the condition or the possibility of reuse of a calculation result obtained during the condition determination process.

Accordingly, it is preferable that the 4-point selection condition includes a condition that respective eigenvalue ratios of two sets of eigenvalues included in a plurality of eigenvalues of a symmetric matrix B of 3 rows and 3 columns expressed as follows are higher than respective predetermined values. A single combination of thresholds (predetermined values) may be set for a set of ratios of eigenvalues. Alternatively, a plurality of combinations of thresholds may be set and the 4-point selection condition may be set such that the respective ratios of the two sets of eigenvalues are higher than two thresholds corresponding to any of the combinations, respectively. The symmetric matrix B is represented by:

$$B = \sum_{i=0}^{3}(p_i - d_4)(p_i - d_4)^T,$$

where $p_i$ (i=0, 1, 2, 3) denotes each vertex of the tetrahedron and $d_4$ denotes a centroid of the tetrahedron.

The magnetic sensor control device may further comprise a buffer for storing a specific number of input magnetic data. The selection section may select, as first and second points, two magnetic data corresponding to two points most distant from each other along a specific direction from the magnetic data stored in the buffer, and furthermore select, as third and fourth points, two magnetic data that have not been selected as the first or second point.

When two magnetic data corresponding to two points most distant from each other along a specific direction is selected, it is possible to obtain an offset more accurately than when magnetic data corresponding to the two points most distant from each other is not selected, even if points corresponding to magnetic data stored in the buffer concentrate on or around a specific plane.

When "a" denotes a vector in the specific direction, "d" denotes a position vector of a centroid of points corresponding to the specific number of magnetic data stored in the buffer, and "q" denotes a position vector of a point corresponding to sample magnetic data stored in the buffer, the selection section may select magnetic data maximizing D=a·(q−d) as the first point and magnetic data minimizing D=a·(q−d) as the second point.

If the first and second points are selected in this manner, then two magnetic data corresponding to the two points most distant from each other along the specific direction is selected.

An eigenvector corresponding to a minimum eigenvalue of a symmetric matrix C of 3 rows and 3 columns expressed as follows may be the vector in the specific direction:

$$C = \sum_{q_i \in Q}(q_i - d_N)(q_i - d_N)^T,$$

where Q denotes a set of position vectors qi, $\{q_i | 0 \leq i \leq N-1\}$, and $d_N$ denotes the position vector of the centroid of the points indicated by the position vectors qi.

When points corresponding to magnetic data stored in the buffer concentrate on or around a specific plane, selecting two magnetic data corresponding to two points most distant from each other along a direction perpendicular to the plane can obtain an offset more accurately than when magnetic data corresponding to the two points is not selected. The direction of an eigenvector corresponding to the minimum eigenvalue of the symmetric matrix C is perpendicular to a plane around which points corresponding to magnetic data stored in the buffer concentrate.

The function of each of the plurality of the sections included in the device of the present invention is realized by a hardware resource, the function of which is specified by its construction, a hardware resource, the function of which is specified by a program, or a combination of these resources. The function of each of the plurality of the sections is not necessarily realized by a hardware resource physically independent of each other. The present invention can be specified not only by a magnetic sensor control device but also by a magnetic measurement apparatus combining the magnetic sensor control device and the 3D magnetic sensor, a magnetic sensor control method, and a magnetic sensor control program.

In a second aspect, a magnetic sensor control device for achieving the object of the present invention comprises an input section for inputting a plurality of magnetic data having 2 components sequentially output from a 2-dimensional (2D) magnetic sensor; a selection section for selecting 3 magnetic data satisfying a predetermined 3-point selection condition from the plurality of the input magnetic data; a calculation section for calculating a center point equally distant from 3 points corresponding to the 3 selected magnetic data; and a setting section for setting the center point as an offset of the magnetic data.

Since 3 magnetic data satisfying a predetermined 3-point selection condition is selected from a plurality of magnetic data output sequentially from the 2D magnetic sensor, and a center point equally distant from 3 points having components corresponding to the 3 selected magnetic data is calculated, there is no need to use a statistical process in calculating the offset so that the offset can be calculated efficiently.

The magnetic sensor control device for achieving the object of the present invention may further comprise a buffer for storing the plurality of the input magnetic data. When new magnetic data is stored in the buffer, the selection section may select one of 3 data structures provided for storing 3 magnetic data as candidates for selection, and update the selected data structure with the new magnetic data stored in the buffer, provided that the length of a chord of a circular arc passing through 3 points corresponding to the 3 magnetic data stored in the 3 data structures is increased or at least is not decreased by updating the one data structure, in which magnetic data corresponding to one of two points at both ends of the circular arc is stored, with the new magnetic data stored in the buffer.

A circle passing through 3 points corresponding to 3 magnetic data corresponds to a circle centered at a point corresponding to the finally obtained offset. To allow the circle to approach a true circle centered at a point corresponding to the correct offset, it is preferable that the area of the circle be increased and 3 points defining the circle be distributed evenly over a wide range along its circumference. Accordingly, it is preferable that the length of a chord passing through 3 points having components corresponding to 3 magnetic data be large. Thus, it is preferable that, when new magnetic data is input, the data structure to be updated be selected such that the length of a chord of a circular arc passing through 3 points having components corresponding to 3 magnetic data stored in the 3 data structures is increased by updating the data structure.

When new magnetic data is stored in the buffer, the selection section may obtain magnetic data which has not been selected as any candidate for selection of magnetic data of the two points at both the ends of the circular arc, and set the obtained magnetic data as a candidate for selection of magnetic data of an intermediate point of the circular arc.

Here, after magnetic data of both the ends of the circular arc is tentatively determined, magnetic data which has been stored in the buffer without being selected as either end of the circular arc is set as a candidate for selection of an intermediate point of the circular arc, thereby reducing the number of magnetic data required to calculate the offset. This reduces the number of manipulations of a moving body containing the 2D magnetic sensor, which would be required to collect magnetic data for calculation of the magnetic data offset, and this shortens the time required to calculate the offset.

The 3-point selection condition may include a condition associated with the distortion of a triangle having vertices corresponding to 3 points having components corresponding to the 3 magnetic data stored in the data structures from a regular triangle.

A circle passing through 3 points having components corresponding to 3 magnetic data corresponds to a circle centered at a point having components corresponding to the offset. To allow the circle to approach a true circle centered at an exact point having components corresponding to the correct offset, it is preferable that 3 points defining the circle be distributed at regular intervals along the circumference. Accordingly, it is preferable to set a 3-point selection condition associated with the distortion of a triangle having vertices corresponding to 3 points having components corresponding to 3 magnetic data from a regular triangle. When a triangle having vertices corresponding to 3 points having components corresponding to 3 magnetic data is a regular triangle, the 3 points are distributed at regular intervals along the circumference.

The distortion of the triangle from the regular triangle can be defined based on some properties of triangles.

For example, the 3-point selection condition may include a condition that variation between inner angles of the triangle is within a predetermine range. In addition, for example, the 3-point selection condition may include a condition that variation between lengths of sides of the triangle is within a predetermined range. Further, for example, the 3-point selection condition may include a condition that variation between distances of vertices of the triangle from a centroid of the triangle is within a predetermined range.

Although such a parameter indicating the variation can be defined mathematically, it is preferable that the variation be defined taking into consideration the amount of calculation or the processing time required for determination about the condition or the possibility of reuse of a calculation result obtained during the condition determination process.

Accordingly, it is preferable that the 3-point selection condition include a condition that the ratio of a minimum eigenvalue of a symmetric matrix A of 2 rows and 2 columns expressed as follows to a maximum eigenvalue of the symmetric matrix A be equal to or higher than a predetermined value:

$$A = \sum_{i=0}^{2} (p_i - d_3)(p_i - d_3)^T,$$

where $p_i$ (i=0, 1, 2) denotes each vertex of the triangle and $d_3$ denotes a centroid of the triangle.

The minimum and maximum eigenvalues required for determination about the 3-point selection condition can be obtained as the roots of a quadratic equation. This reduces the amount of calculation compared to, for example, when the variation between inner angles of the triangle, the variation between the lengths of the sides of the triangle, the variation between distances of the vertices from the centroid of the triangle, or the like is used for determination of the 3-point selection condition. For example, a standard deviation can be considered as one definition of the variation.

The 3-point selection condition includes a condition that the ratio is maximized. Namely, the selection section sequentially applies the 3-point selection condition to a plurality of triangles corresponding to a plurality of combinations of the input magnetic data so as to find a optimum triangle which best satisfies the 3-point selection condition, the apparatus further comprising a notification section that notifies a user of a progress state of operation of the selection section by generating a sound of a music note varying depending on the progress state.

By using a condition that the ratio of the minimum eigenvalue of the symmetric matrix A to the maximum eigenvalue of the symmetric matrix A is maximized at the points, it is possible to select 3 points, corresponding to vertices forming a triangle having the largest area and the smallest distortion from a regular triangle, from the points corresponding to the plurality of the input magnetic data stored in the buffer.

The magnetic sensor control device may further comprise a progress value output section for outputting a value of the ratio or a progress value derived based on the ratio, indicating a progress state of selection of the 3 magnetic data satisfying the 3-point selection condition until the selection is completed after the selection is initiated.

By outputting the ratio of the minimum eigenvalue of the symmetric matrix A to the maximum eigenvalue of the symmetric matrix A or the progress value indicating the progress state derived based on the ratio, the magnetic sensor control device allows an external system to use information about the progress state until the selection is completed after the selection is initiated.

The progress value may be an angle corresponding to a central angle of the circular arc passing through the 3 points having the components corresponding to the 3 magnetic data stored in the 3 data structures.

A magnetic measurement apparatus for achieving the object of the present invention includes the magnetic sensor control device and the 2D magnetic sensor.

The magnetic measurement apparatus for achieving the object of the present invention may further comprise a notification section for notifying a user of the progress state by generating a sound of a music note varying depending on the progress value or the ratio.

Since the magnetic measurement apparatus includes the notification section for generating a sound of a note varying depending on the progress value or the ratio, the user can be aware, from the generated sound, of the progress state of the selection of the 3 magnetic data satisfying the 3-point selection condition until the selection is completed after the selection is initiated.

The magnetic measurement apparatus for achieving the object of the present invention may further comprise a display section for allowing the user to view the progress state according to the progress value or the ratio.

Since the magnetic measurement apparatus includes the display section for displaying the progress state of the 3-point selection according to the progress value or the ratio, the user can view the progress state of the selection of the 3 magnetic data satisfying the 3-point selection condition until the selection is completed after the selection is initiated.

An offset setting method for achieving the object of the present invention comprises inputting a plurality of magnetic data having 2 components sequentially output from a 2-dimensional (2D) magnetic sensor; selecting 3 magnetic data satisfying a predetermined 3-point selection condition from the plurality of the input magnetic data; calculating a center point equally distant from 3 points each represented by 2 components of a corresponding one of the 3 selected magnetic data; and setting components of the center point as an offset of the magnetic data.

Since 3 magnetic data satisfying a predetermined 3-point selection condition is selected from a plurality of magnetic data output sequentially from the 2D magnetic sensor and a center point equally distant from 3 points corresponding to the 3 selected magnetic data is calculated, there is no need to use a statistical process in calculating the offset so that the offset can be calculated efficiently.

An offset setting program for achieving the object of the present invention allows a computer to function as an input section for inputting a plurality of magnetic data having 2 components sequentially output from a 2-dimensional (2D) magnetic sensor; a selection section for selecting 3 magnetic data satisfying a predetermined 3-point selection condition from the plurality of the input magnetic data; a calculation section for calculating a center point equally distant from 3 points corresponding to the 3 selected magnetic data; and a setting section for setting the center point as an offset of the magnetic data.

Since 3 magnetic data satisfying a predetermined 3-point selection condition is selected from a plurality of magnetic data output sequentially from the 2D magnetic sensor, and a center point equally distant from 3 points corresponding to the 3 selected magnetic data is calculated, there is no need to use a statistical process in calculating the offset so that the offset can be calculated efficiently.

BRIEF DESCRIPTION OF THE DRAWINGS

FIG. 20 is an association diagram of an embodiment of the present invention.

DETAILED DESCRIPTION OF THE INVENTION

The specification is divided to two parts. The first part describes a first aspect of the invention associated to 3D magnetic sensor system. The second part describes a second aspect of the invention associated to 2D magnetic sensor system. The first aspect of the present invention will be described hereafter in the following order.

A. FIRST EMBODIMENT

[1. Overview]
1-1. Basic Principle
1-2. Hardware Structure
1-3. Software Structure
[2. Procedure]
2-1. Buffer Update
2-2. Tentative Determination of Candidate for Selection of 1st Point
2-3. Tentative Determination of Candidate for Selection of 2nd Point
2-4. Selection of up to 3rd Point
3-Point Update
3-Point Selection Condition
Selection Verification
3-Point Reset
2-5. 4th Point Selection
Overview
4-Point Selection Condition
Orientation Sphere Calculation
Orientation Sphere Verification
Offset Setting

B. SECOND EMBODIMENT

[1. Overview]
1-1. Basic Principle

First, a basic principle of the first embodiment is described.

This embodiment sets an offset to negate magnetization components of a moving body included in an output of a 3D magnetic sensor provided in the moving body. To obtain the offset, this embodiment specifies a spherical surface which approximates a 3D surface by a set of a number of points in a vector space having components corresponding to magnetic data output from the 3D magnetic sensor. This spherical surface will be referred to as a spherical surface of an orientation sphere. The coordinate components specifying the center point of the orientation sphere correspond to the offset, and the radius of the orientation sphere corresponds to the intensity of the magnetic field. Since there is an inherent measurement error in the output of the 3D magnetic sensor, a set of points represented by coordinate components corresponding to the 3 components of the magnetic data does not constitute a true spherical surface even if the moving body is rotated in a constant magnetic field. In this embodiment, 4 points each represented by 3 components of a corresponding one of the magnetic data are selected, and the center point and radius of a spherical surface passing through the 4 selected points is obtained from the 4 points, and the center of the obtained spherical surface is set as an offset. When using this method to reduce an error included in the offset due to an inherent measurement error of the 3D magnetic sensor, it is important to select 4 points having components corresponding to 4 magnetic data including the inherent measurement error, such that the 4 selected points are distributed evenly over a wide range on a spherical surface passing through the 4 points. For better understanding, a supplementary explanation is given with reference to a 2D magnetic sensor instead of the 3D magnetic sensor.

Figure 2A:
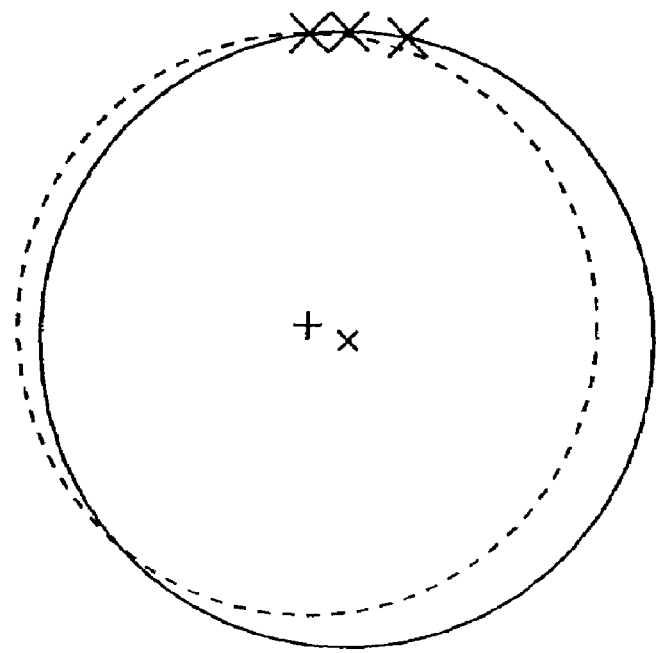
FIGS. 2A and 2B are a schematic diagram of an embodiment of the present invention.
Figure 2B:
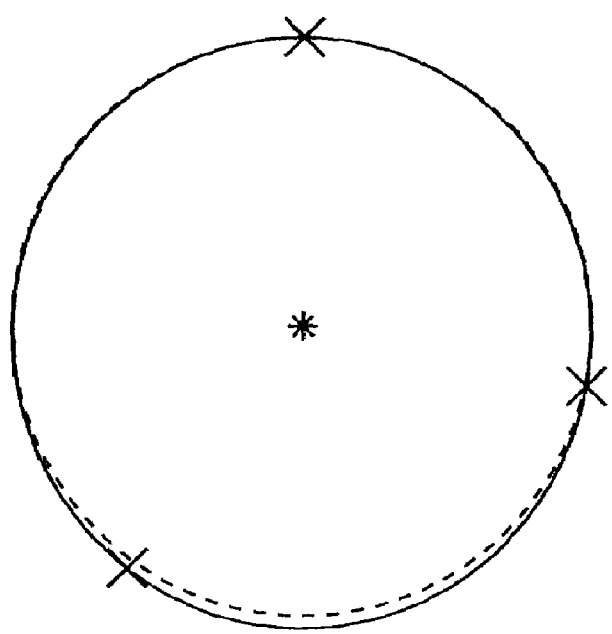

FIGS. 2A and 2B show the relationship between an orientation circle (shown by a solid line) passing through 3 points having components corresponding to magnetic data output from a 2D magnetic sensor and a true orientation circle (shown by a dashed line) which is a set of an infinite number of points having components corresponding to magnetic data of an ideal 2D magnetic sensor with no measurement error. When 3 points having components corresponding to magnetic data of the 2D magnetic sensor are distributed over a narrow range along the circumference of a circle passing through the 3 points, the distance between a center (x) of the orientation circle obtained from the 3 points and a center (+) of the true orientation circle of the ideal 2D magnetic sensor, which is to be obtained, is large as shown in FIG. 2A. On the other hand, when 3 points having components corresponding to magnetic data of the 2D magnetic sensor are distributed over a wide range along the circumference of a circle passing through the 3 points, the distance between a center (x) of the orientation circle obtained from the 3 points and a center (+) of the true orientation circle of the ideal 2D magnetic sensor, which is to be obtained, is small as shown in FIG. 2B. The offset error can be minimized when 3 points having components corresponding to magnetic data of the 2D magnetic sensor are distributed at regular intervals along the circumference of a circle passing through the 3 points, i.e., when a triangle having vertices corresponding to the 3 points is a regular triangle.

In the case of the 3D magnetic sensor, the offset error can be minimized when a tetrahedron having vertices corresponding to 4 points selected to obtain an orientation sphere is a regular tetrahedron. Accordingly, this embodiment selects 4 points having components corresponding to magnetic data such that the distortion of a tetrahedron having vertices corresponding to the 4 points from a regular tetrahedron is less than a specific threshold.

Here, we compare a method of this embodiment in which 4 points are selected in advance, a spherical surface passing through the 4 selected points is obtained, and an offset is obtained from the spherical surface with a method in which a spherical surface which approximates a 3D surface passing through 5 or more points is obtained using a statistical technique and an offset is obtained from the spherical surface. In the method using a statistical technique, if points having components corresponding to magnetic data are unevenly distributed or if peculiar magnetic data is included in a statistical population, the center of an orientation sphere obtained from these points is significantly deviated from the center of the true orientation sphere. Accordingly, to reduce the offset error using the statistical technique, it is necessary to verify the variation of a statistical population used to obtain the orientation sphere using the statistical technique or to select a statistical population. In the method of this embodiment, without using the statistical technique requiring a large amount of calculation, it is possible to obtain an offset with an accuracy not less than the accuracy of an offset obtained through the method using the statistical technique if 4 suitable points can be selected.

1-2. Hardware Structure

Figure 3:
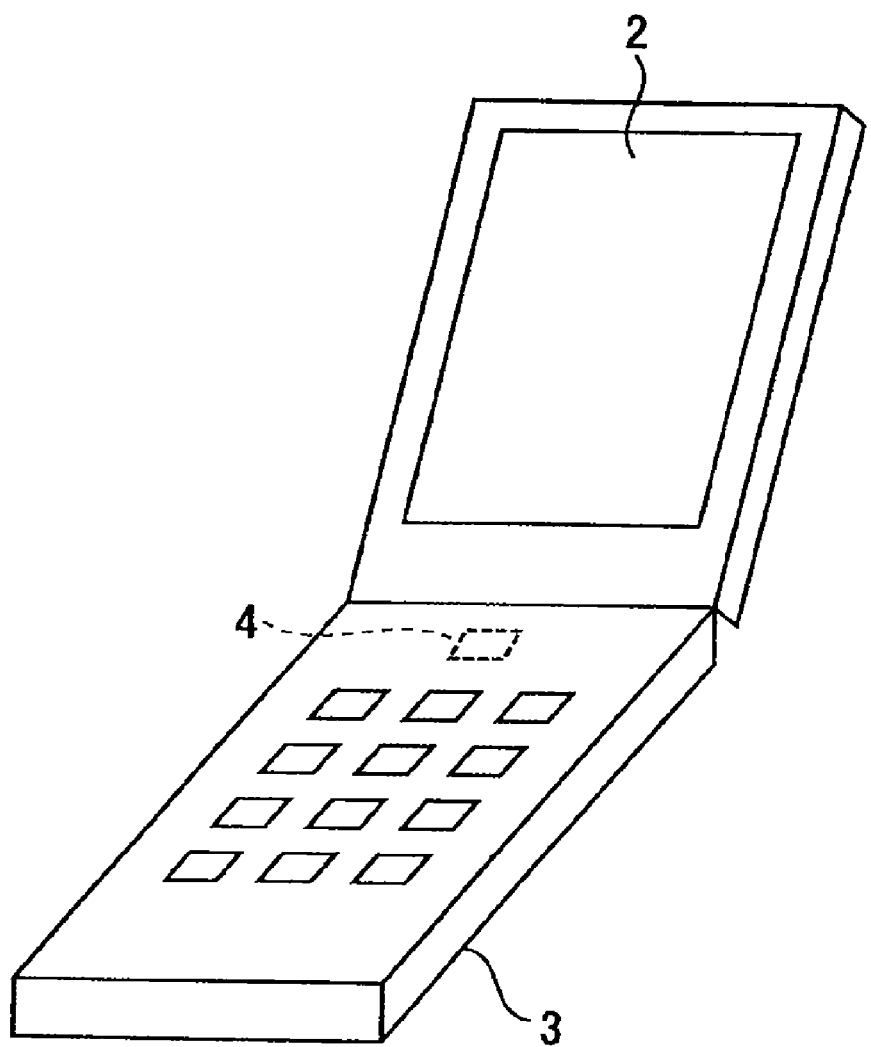
FIG. 3 is a schematic diagram of an embodiment of the present invention of the first aspect.
Figure 3:
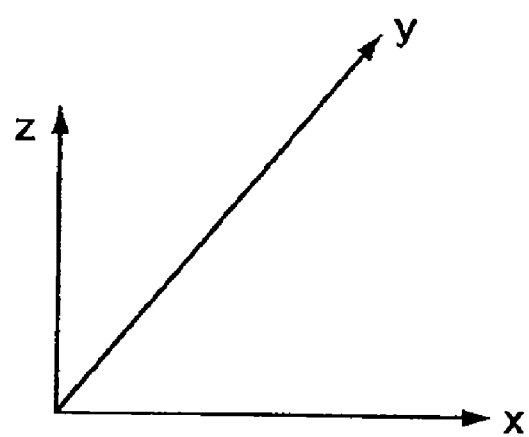

FIG. 3 is a schematic diagram of an external appearance of a mobile phone 3 that is an example of a moving body to which the present invention is applied. The mobile phone 3 includes a 3-dimensional (3D) magnetic sensor 4. The 3D magnetic sensor 4 detects the direction and intensity of a magnetic field by detecting vector components of the magnetic field in three orthogonal directions (x, y, z). A display 2 of the mobile phone 3 displays a variety of character or image information. For example, the display 2 displays a map and an arrow or characters representing the orientation (or azimuth).

Figure 4:
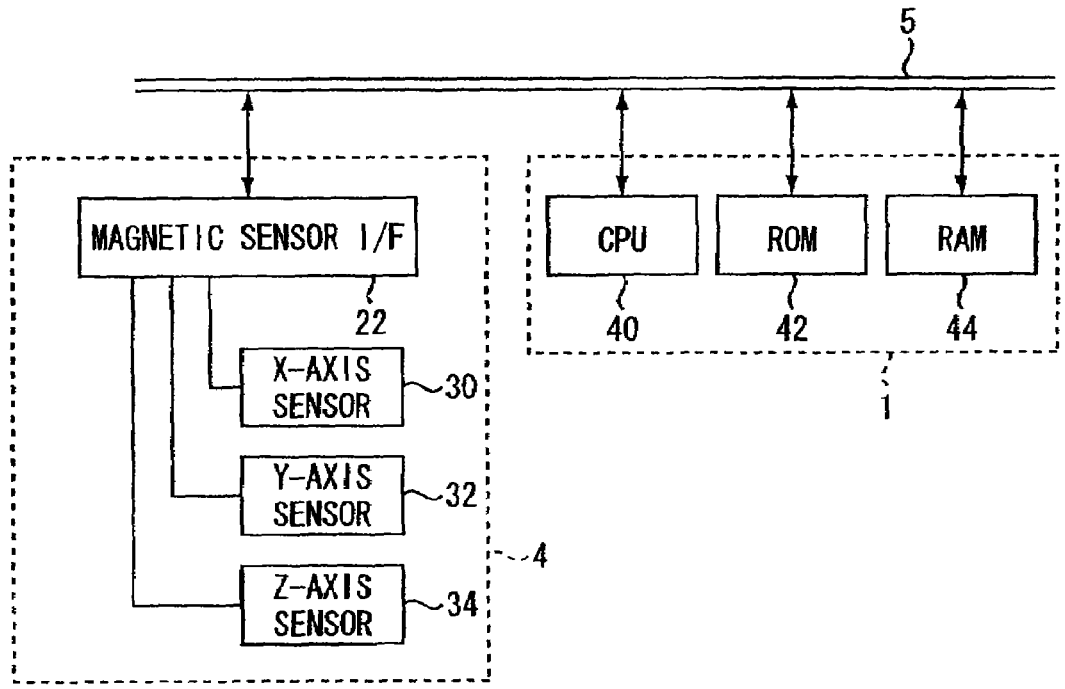
FIG. 4 is a block diagram of an embodiment of the present invention.

FIG. 4 is a block diagram of a magnetic measurement apparatus, including a 3D magnetic sensor 4 and a magnetic sensor control device 1, to which the present invention is applied. The 3D magnetic sensor 4 includes x, y, and z-axis sensors 30, 32, and 34 that are provided in a variety of moving bodies to detect x, y, and z direction components of a magnetic field vector due to terrestrial magnetism. Each of the x, y, and z-axis sensors 30, 32, and 34 includes a magnetic resistance element, a hall sensor, or the like, which may be any type of 1-dimensional magnetic sensor provided that it has directivity. The x, y, and z-axis sensors 30, 32, and 34 are fixed so that their sensitive directions are perpendicular to each other. Outputs of the x, y, and z-axis sensors 30, 32, and 34 are time-divided and input to a magnetic sensor interface (I/F) 22. The magnetic sensor interface 22 analog-to-digital converts inputs from the x, y, and z-axis sensors 30, 32, and 34 after amplifying the inputs. Digital magnetic data output from the magnetic sensor interface 22 is input to the magnetic sensor control device 1 through a bus 5.

The magnetic sensor control device 1 is a computer including a CPU 40, a ROM 42, and a RAM 44. The CPU 40 controls overall operations of a moving body such as the mobile phone 3. The ROM 42 is a nonvolatile storage medium which stores a magnetic sensor control program or a variety of programs (for example, a navigation program) used to implement functions of the moving body, which are executed by the CPU 40. The RAM 44 is a volatile storage medium which temporarily stores data to be processed by the CPU 40. The magnetic sensor control device 1 and the 3D magnetic sensor 4 may be constructed as a one-chip magnetic measurement apparatus.

1-3. Software Structure

Figure 5:
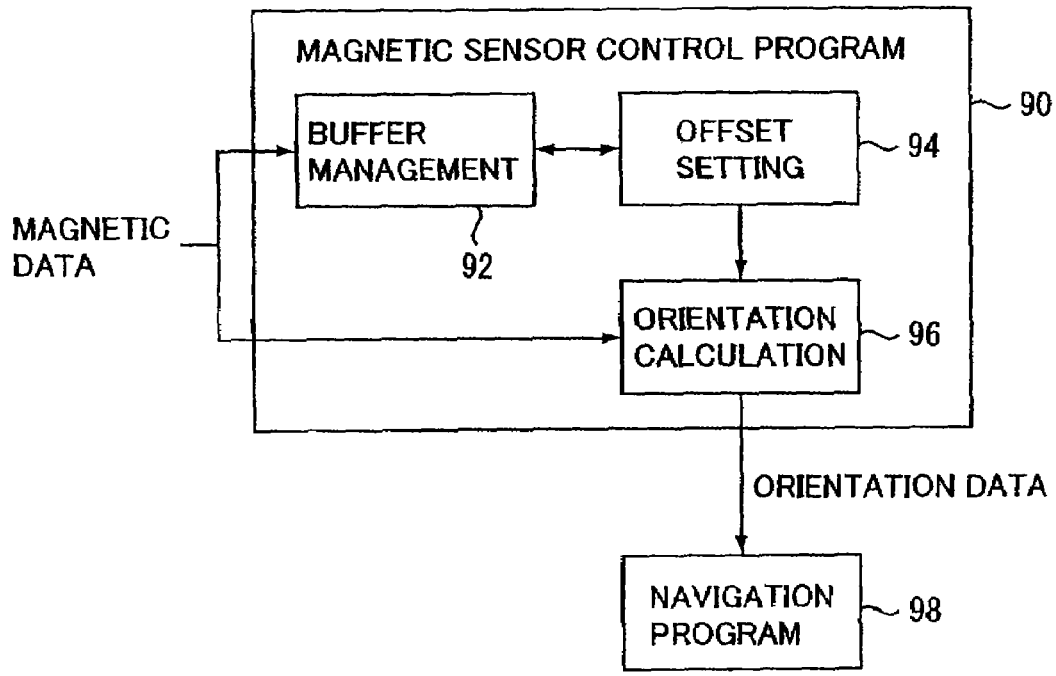
FIG. 5 is a block diagram of an embodiment of the present invention.

FIG. 5 is a block diagram of a magnetic sensor control program 90. The magnetic sensor control program 90 is stored in the ROM 42 to provide orientation data to a navigation program 98. The orientation data is 2D vector data representing the orientation of the Earth's magnetic field. As 3D vector data, the orientation data may be provided to the navigation program 98. When the CPU 40 executes the magnetic sensor control program 90, a combination of the CPU 40, the RAM 44, and the ROM 42 functions as a magnetic sensor control device. The magnetic sensor control program 90 is constructed as a group of modules such as a buffer management module 92, an offset setting module 94, and an orientation calculation module 96.

The buffer management module 92 is a program part that stores a plurality of magnetic data sequentially input from the magnetic sensor 4 in a buffer in order to use the magnetic data in offset calculation. The buffer management module 92 allows the CPU 40 to function as input section. The magnetic data sequentially input from the magnetic sensor 4 may be sequentially subjected to selection and unselected magnetic data may then be discarded. However, if an nth point selection condition (n=2, 3) and an n+kth point selection condition (k=1, 2) are different, magnetic data may be selected as the n+kth point even if it has not been selected as the nth point. Accordingly, the buffer managed by the buffer management module 92 is used not only to buffer the difference between input and processed times but also to allow magnetic data, which has not been selected once, to be used again as a candidate for selection. This buffer may be embodied not only in hardware but also in software.

The offset setting module 94 is a program part that selects 4 magnetic data from the magnetic data held by the buffer management module 92 and calculates an offset from the 4 selected magnetic data and then sets the calculated offset. The offset setting module 94 allows the CPU 40 to function as selection, calculation, and setting sections.

The orientation calculation module 96 is a program part that generates orientation data using both the magnetic data sequentially input from the magnetic sensor 4 and the set offset. Specifically, the orientation calculation module 96 outputs, as orientation data, all or two of the 3 components obtained by subtracting the components of the offset data from the components of the magnetic data which is 3D vector data.

The navigation program 98 is a known program that searches for a route to the destination and displays the route on a map. Since it is easy to recognize the map, the map is displayed such that the orientation of the map matches the real-world orientation. Accordingly, for example, when the mobile phone 3 is rotated, the map displayed on the display 2 is rotated relative to the display 2 such that the map is not rotated relative to the earth. The orientation data is used in this map display processing. Of course, the orientation data may be used only to display north, south, east and west by characters or arrows.

[Procedure]

2-1. Buffer Update

Figure 6:
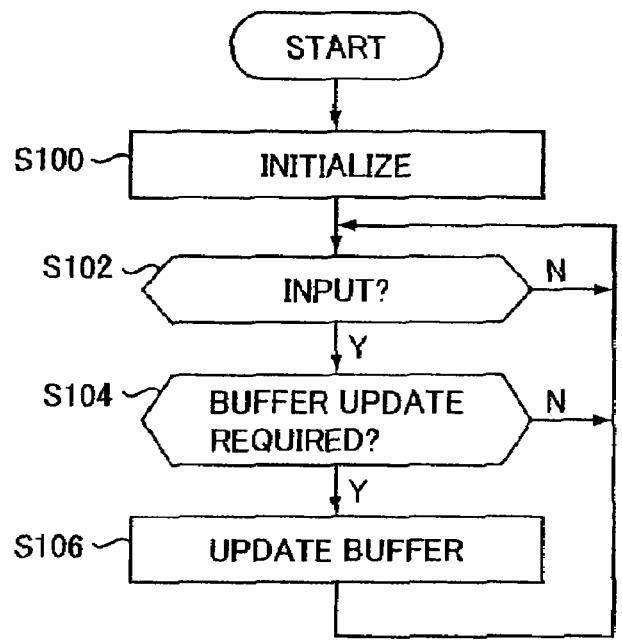
FIG. 6 is a flow chart of an embodiment of the present invention.

FIG. 6 is a flow chart of a buffer update procedure. The CPU 40 performs the procedure of FIG. 6 by executing the buffer management module 92 when an offset update request has been made.

At step S100, a buffer, which stores a plurality of magnetic data used in offset calculation, is initialized. For example, data stored in a buffer area of the RAM 44 is deleted.

At step S102, the CPU 40 waits until new magnetic data is input from the magnetic sensor 4.

Figure 7:
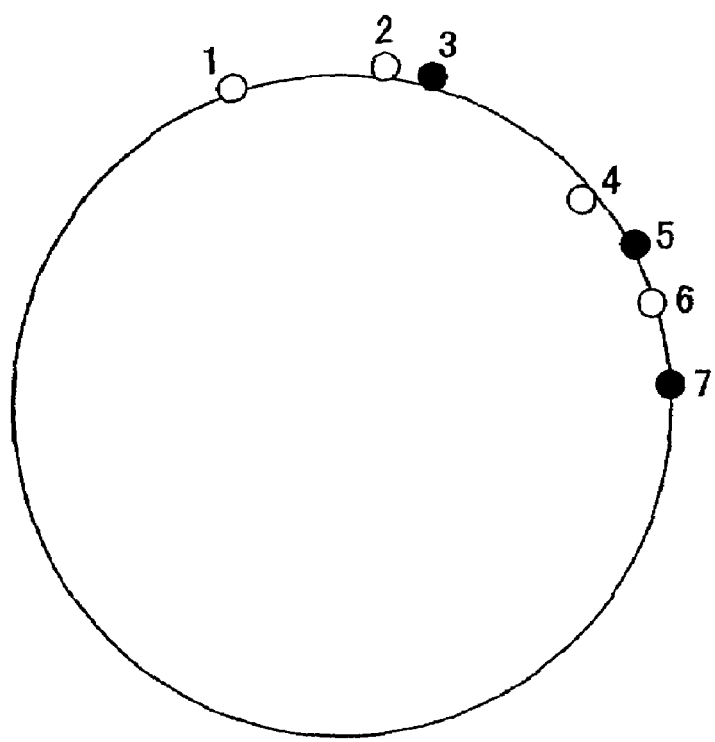
FIG. 7 is a schematic diagram of an embodiment of the present invention.

When new magnetic data is input from the magnetic sensor 4, the CPU 40 determines whether or not it is necessary to update the buffer (S104). When a plurality of magnetic data is sequentially input from the magnetic sensor 4 with almost no movement of the mobile phone 3, the distance between two points having components corresponding to two sequentially input magnetic data is small. It is not preferable to include two points near each other in 4 points necessary to obtain the offset. In addition, storing a plurality of magnetic data corresponding to components of near points in a buffer with a limited capacity wastes memory resources and causes unnecessary buffer update processes. In the following manner, it is determined whether or not it is necessary to update the buffer. For example, if the distance between a point having components corresponding to the last input magnetic data and a point having components corresponding to magnetic data immediately before the last input magnetic data is less than a given threshold, it is determined that it is unnecessary to update the buffer and the last input magnetic data is discarded without being stored in the buffer. Otherwise, it is determined that it is necessary to update the buffer. As a result, for example when a plurality of magnetic data is input in an order as shown in FIG. 7, magnetic data shown by filled circles is not stored in the buffer and magnetic data shown by open circles is stored in the buffer. In FIG. 7, the order in which the plurality of magnetic data is input is denoted by numerals assigned to the open and filled circles.

If the buffer update necessity determination is made according to the following condition in addition to the above determination condition (or criterion), it is possible to increase the probability of success of the calibration. Let "$q_0, q_1, \ldots q_{Nqmax-1}$" be a data sequence of Nqmax data elements stored in the buffer and let "Q" be a set of $\{qi | 0 \leq i \leq N_{qmax}-1\}$.

Additional Update Condition:

The last magnetic data is stored to update the buffer only if, for a given threshold $q_{min}$, a point q having components corresponding to the magnetic data satisfies "$\|q-q_i\|_2 > q_{min}$" for every i where "$i < N_{qmax-1}$". $\|q-q_i\|_2$ indicates a distance between the points q and qi.

Failure of the calibration indicates that, after an offset update request is made to start storing magnetic data, the offset cannot be determined from the stored magnetic data, resulting in discarding of all the magnetic data stored until then.

If it is determined that it is necessary to update the buffer, the buffer is updated (S106). An algorithm used for this update is, for example, a First-In, First-Out (FIFO) algorithm.

2-2. Tentative Determination of Candidate for Selecting 1st Point

Figure 1:
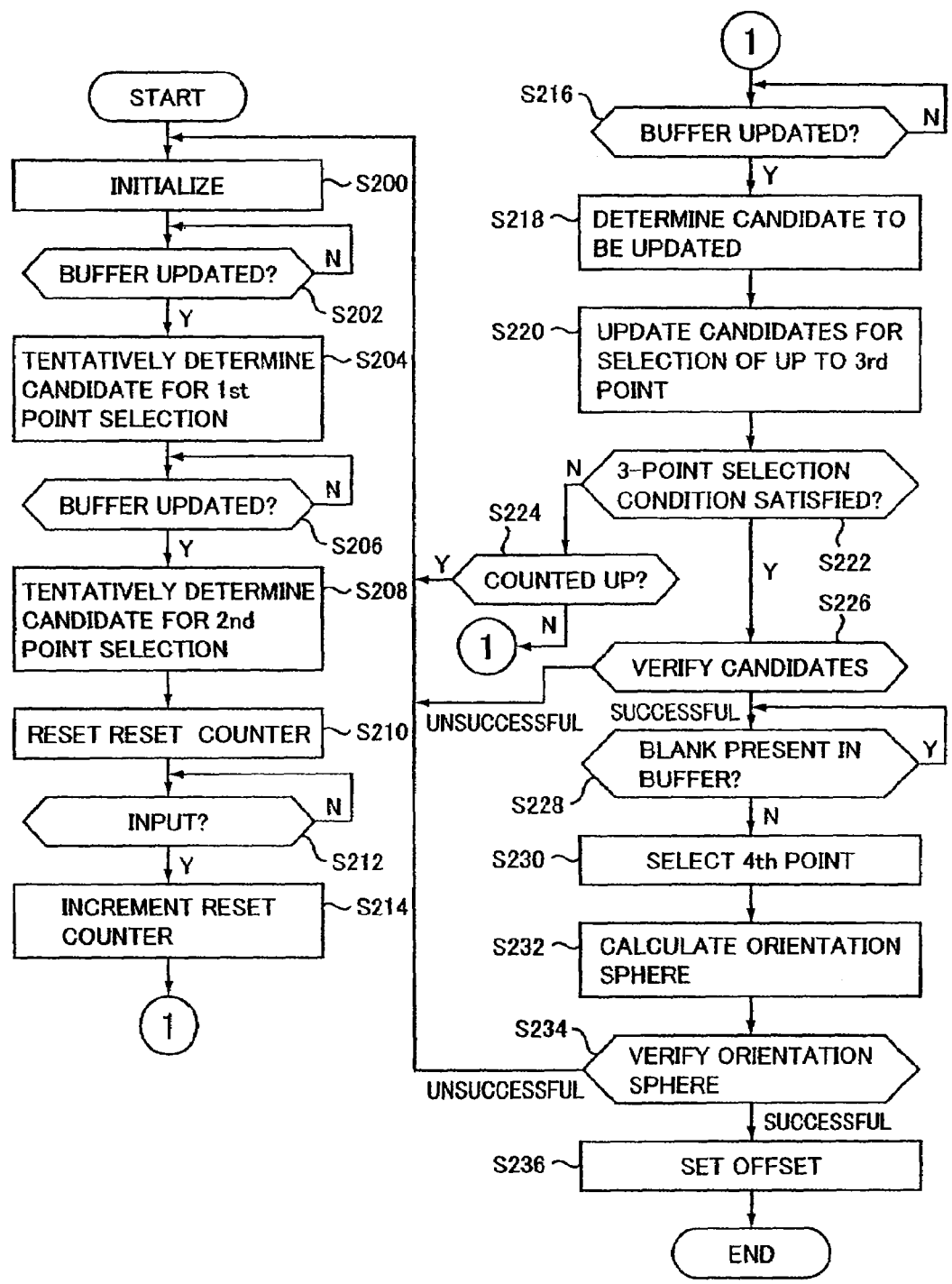
FIG. 1 is a flow chart of an embodiment of the present invention.

FIG. 1 is a flow chart of an offset setting process. The CPU 40 performs the procedure of FIG. 1 by executing the offset setting module 94 when an offset update request has been made. When a procedure described below is performed by executing the offset setting module 94, the procedure using the buffer management module 92 is performed in parallel in a multitasking environment.

At step S200, initialization is performed to discard all candidates for selection. Specifically, four data structures $p_0$, $p_1$, $p_2$, and $p_3$ used to store candidates for selection, which are declared by the offset setting module 94, are reset and the buffer is also initialized. As will be described later, a plurality of magnetic data are stored as candidates for selection in the data structures $p_0$, $p_1$, $p_2$, and $p_3$ until up to the 4th point is selected and the offset is set. Each of the data structures $p_0$, $p_1$, $p_2$, and $p_3$ is a sequence of 3 variables for storing 3 components of magnetic data.

At step S202, the CPU 40 awaits the buffer update described above.

Once the buffer is updated, a candidate for selection of the first point is tentatively determined (S204). Specifically, the first magnetic data input after the buffer is initialized (S200) is determined to be a candidate for selection of the first point. The candidate for selection of the first point is stored in the data structure $p_0$. The candidate for selection of the first point in this process is just a tentatively determined one since there is a possibility that the data structure pa used to store the candidate for selection of the first point will be updated as described later.

2-3. Tentative Determination of Candidate for Selecting 2nd Point

At step S206, the CPU 40 waits until the buffer is updated again.

Once the buffer is updated again, a candidate for selection of the second point is tentatively determined. Specifically, the second magnetic data input after the buffer is initialized (S200) is determined to be a candidate for selection of the second point. The candidate for selection of the second point is stored in the data structure $p_1$. The candidate for selection of the second point in this process is also just a tentatively determined one since there is a possibility that the data structure $p_1$ used to store the candidate for selection of the second point will be updated as described later.

2-4. Selection of up to 3rd Point

Update of 3 Points

At step S210, a reset counter is reset. The reset counter is set to count up to a predetermined count number. This reset counter is used to prevent the occurrence of a problem that the offset calculation may never be completed without determining a candidate for selection of the 3rd point after the candidate for selection of the second point is tentatively determined. Specifically, there is a possibility that the candidate for selection of the third point will be not determined if the candidates for selection of up to the second point are not updated even though the magnetic field in which the mobile phone 3 is present has been rapidly changed immediately after the tentative determination of the candidate for selection of the second point. This is because, if the intensity of the magnetic field is rapidly changed although no candidate for selection of the 3rd point has been determined, the conditions are not satisfied as described below unless the size of a circle passing through 3 candidate points converges within a predetermined range and a triangle having three vertices corresponding to the 3 candidate points satisfies a specific condition.

At steps S212 and S214, if new magnetic data is input, the reset counter is incremented. This is to count the number of magnetic data, which is input after the candidate for selection of the second point is tentatively determined initially at step S208.

At step S216, the CPU 40 waits until the buffer is updated again.

When the buffer is updated again, it is determined, at step S218, which one of the currently stored candidates for selection of the 1st to 3rd points is to be updated with magnetic data that has been last input and last stored in the buffer in order to store the magnetic data as a candidate selected according to the 3 point selection condition (if the selection based on the 3 point selection condition has not been performed, the same procedure is performed although candidates for selection of only up to 2nd point are currently stored). That is, it is determined which one of the data structures $p_0$, $p_1$, and $p_2$ will store magnetic data that has been last input and last stored. This is because the data structures $p_0$, $p_1$, and $p_2$ are defined differently as follows.

3 points having components corresponding to magnetic data stored in the data structures $p_0$, $p_1$, and $p_2$ uniquely specify a circular arc, which passes through the 3 points, provided that they do not lie on the same straight line. The data structures $p_0$ and $p_1$ are defined as data structures which store magnetic data corresponding to components of points at both ends of the circular arc. The data structure $p_2$ is defined as a data structure which stores magnetic data corresponding to components of an intermediate point of the circular arc. Accordingly, it is necessary to determine which one of the data structures $p_0$, $p_1$, and $p_2$ is to be used to store the magnetic data that has been last input and last stored in the buffer in order to store the candidates for selection of up to the 3rd point until the 3rd point is selected.

The following is the reason why the data structures $p_0$, $p_1$, and $p_2$ are defined as described above. The 3 candidate points are positioned on the spherical surface of an orientation sphere that passes through the 4 candidate points. As described above, the more evenly the 4 points used to obtain an orientation sphere are distributed over a wide range on its spherical surface passing through the 4 points, the smaller the error the offset has. Accordingly, the offset error decreases as the length of a chord of a circular arc passing though 3 candidate points increases until it reaches a certain length and the error is great if the length of the chord is too small.

Therefore, it is preferable that the candidates for selection of up to the 3rd point be updated each time magnetic data is stored in the buffer so that the length of the chord of the circular arc passing through the 3 candidate points is increased until it reaches a certain length.

Figures 8A, 8B, 8C:
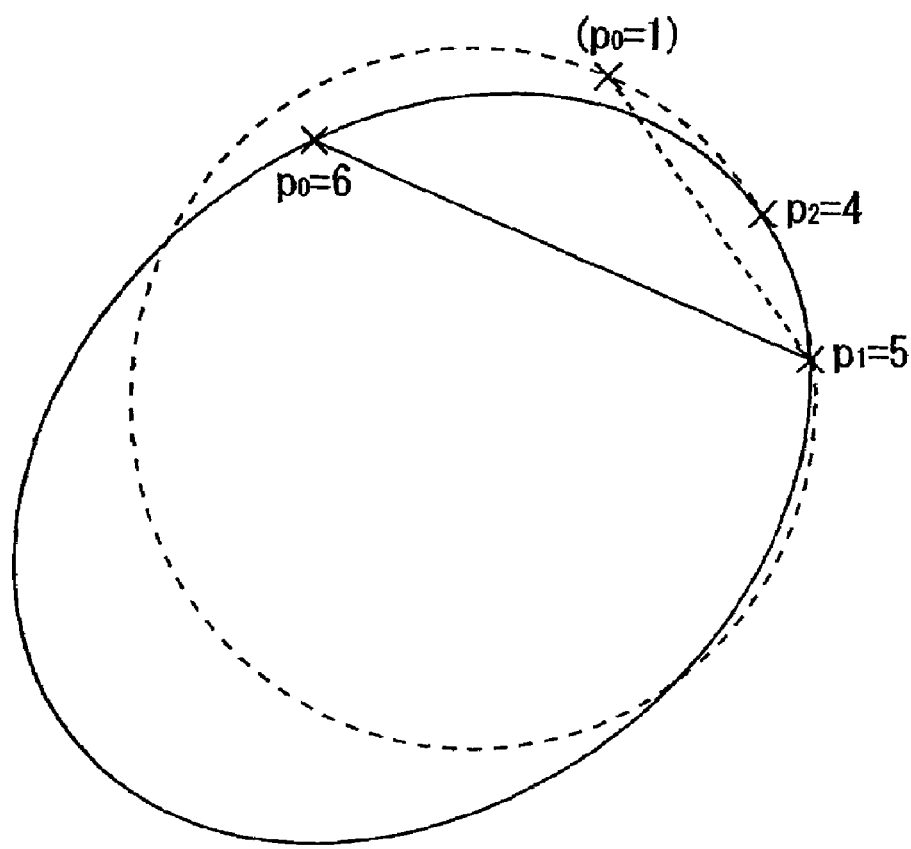
FIGS. 8A, 8B and 8C are a schematic diagram of an embodiment of the present invention.

FIGS. 8A-8C are schematic diagrams illustrating update of 3 candidate points. Here, it is assumed that magnetic data as shown in FIG. 8B has been stored in data structures $p_0$, $p_1$, and $p_2$. Numerals 1, 4, 5, and 6 shown in FIG. 8 are assigned to manage the order of storage in the buffer. Specifically, a plurality of magnetic data managed in the buffer has been stored in corresponding data structures in increasing order of the numerals. Let magnetic data 1, magnetic data 4, magnetic data 5, and magnetic data 6 be a plurality of magnetic data managed with the numerals. Then, a chord of a circular arc passing through the 3 candidate points is a line segment (shown by a dashed line) connecting a point having components corresponding to the magnetic data 1 and another point having components corresponding to the magnetic data 5. It is assumed that the magnetic data 6 is then stored in the buffer. Here, the chord of the circular arc passing through the 3 points having the components of the 3 magnetic data is calculated as the distance between a point having components corresponding to magnetic data stored in the data structure $p_0$ and a point having components corresponding to magnetic data stored in the data structure $p_1$ according to the definition of the data structures $p_0$, $p_1$, and $p_2$. Accordingly, if a point having components corresponding to the magnetic data 6 has a positional relationship as shown in FIG. 8A to the 3 points having components corresponding to the magnetic data 1, 4, and 5, a calculation result that the length of the chord of the circular arc is increased cannot be obtained unless the candidate for selection stored in the data structure $p_0$ is updated. In addition, if the magnetic data 6 has a value which does not increase the length of the chord of the circular arc, the calculation result is that the length of the chord of the circular arc is decreased unless the candidate for selection stored in the data structure $p_2$ is updated and thus there is a need to update the candidate for selection stored in the data structure $p_2$.

Figure 9:
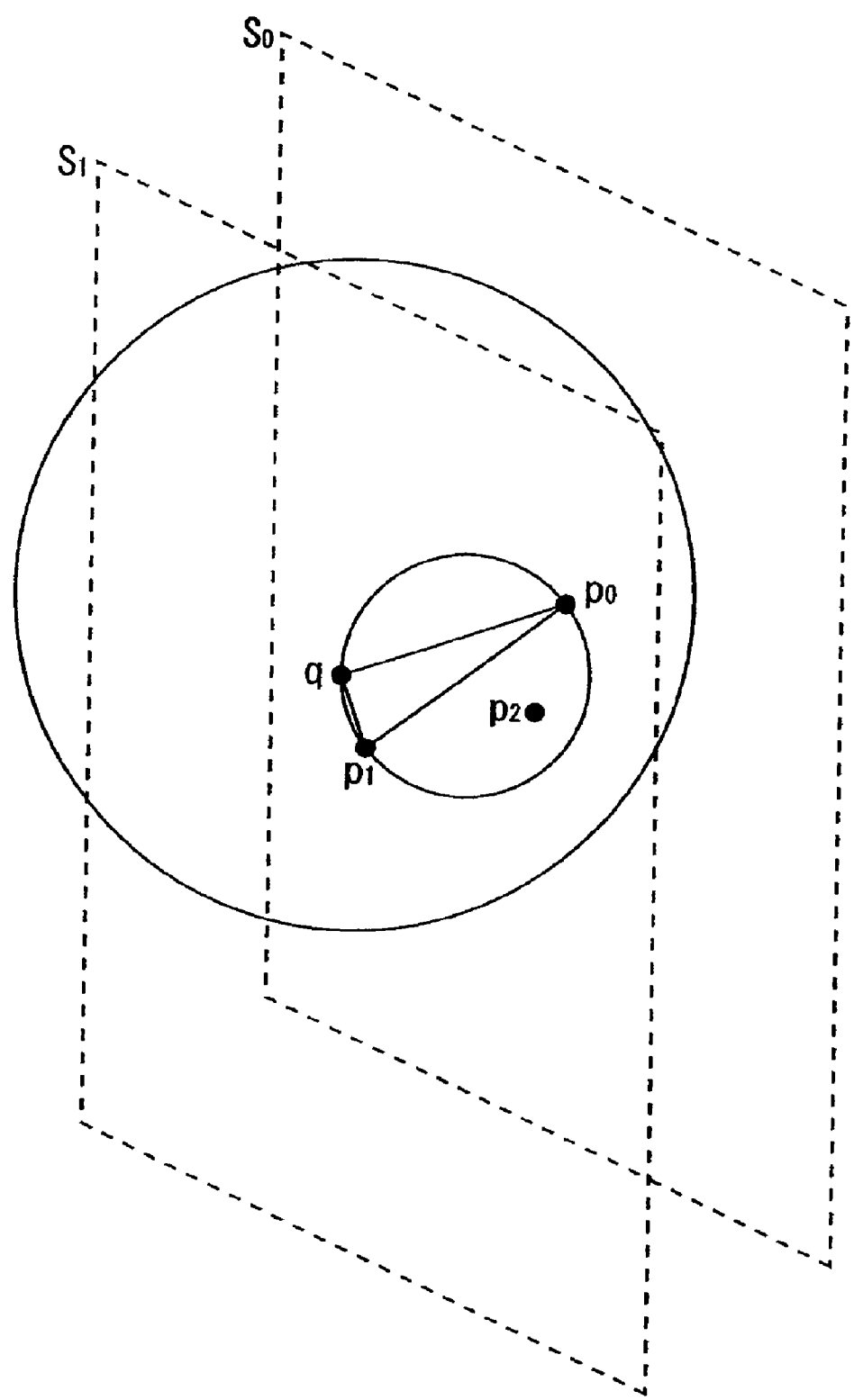
FIG. 9 is a schematic diagram of an embodiment of the present invention.

A condition in which the chord of a circular arc passing through 3 points having components corresponding to 3 magnetic data is lengthened most efficiently and at least is not shortened each time the update is performed is derived in the following manner. Here, let q be the last magnetic data stored in the buffer. Let $p_0$, $p_1$, and $p_2$ magnetic data stored in the data structures. In FIG. 9, points having components corresponding to q, $p_0$, $p_1$, and $p_2$ are shown by filled circles, an orientation sphere passing through the 4 points is shown by a solid line, and two surfaces $S_0$ and $S_1$ perpendicular to a line segment $p_0p_1$ passing through $p_0$ and $p_1$ are shown by dashed lines. The range of points having components corresponding to the magnetic data q, which increases the length of the chord of the circular arc passing through the 3 candidate points, includes points outside a space which is sandwiched between the surfaces $S_0$ and $S_1$ and through which the line segment $p_0p_1$ runs. In this range, Inequalities (3) and (4) are true.

$$(q-p_1)\cdot(p_1-p_0) > 0 \qquad (3)$$

$$(q-p_0)\cdot(p_1-p_0) < 0 \qquad (4)$$

When Inequality (3) is true, the chord can be lengthened by updating $p_2$ with $p_1$ and updating $p_1$ with q. When Inequality (4) is true, the chord can be lengthened by updating $p_2$ with $p_0$ and updating $p_0$ with q. When any of Inequalities (3) and (4) is not true, the chord is not lengthened although $p_2$ is updated with q.

At step S220, a candidate for selection that has been determined to be updated as described above is updated with the last magnetic data stored in the buffer. As a result, for example, the data structures $p_0$, $p_1$, and $p_2$ in which magnetic data is stored as shown in FIG. 8B are updated as shown in FIG. 8C. Here, a circle passing through the 3 points, which have been candidates for selection, is updated with a new circle included in a plane that intersects a plane including the circle. This process tends to increase the area of the circle passing through the 3 points that have been candidates for selection.

3-Point Selection Conditions

At step S222, it is determined whether or not magnetic data corresponding to 3 candidates for selection satisfies one of the 3-point selection conditions. The 3-point selection conditions are derived from two points of view. The first point of view is whether or not 3 points having components corresponding to magnetic data as candidates for selection are sufficiently spread over the circumference of a circle passing through the 3 points, i.e., whether or not a triangle having vertices corresponding to the 3 points is close to a regular triangle. Accordingly, when the selection is performed from the first point of view, the distortion of the triangle having vertices corresponding to the 3 points having components corresponding to the magnetic data as candidates for selection from a regular triangle is calculated. The second point of view is whether or not the area of a circle passing through 3 points having components corresponding to magnetic data as candidates for selection is large enough. When the area of the circle passing through the 3 points is small, the 3 points are distributed over a narrow range on the spherical surface of an orientation sphere passing through the 3 points and magnetic fields other than those assumed to calculate the correct offset have been measured. Also when the area of the circle passing through the 3 points is too large, magnetic fields other than those assumed to calculate the correct offset have been measured. Accordingly, when the selection is performed from the second point of view, the radius of a circle passing through 3 points having components corresponding to magnetic data as candidates for selection is calculated. In the following description, the condition for determination as to whether or not to select the candidates for selection from the first point of view is also referred to as a 3-point selection condition and the determination as to whether or not to select the candidates for selection from the second point of view is also referred to as 3-point selection verification.

Figure 10:
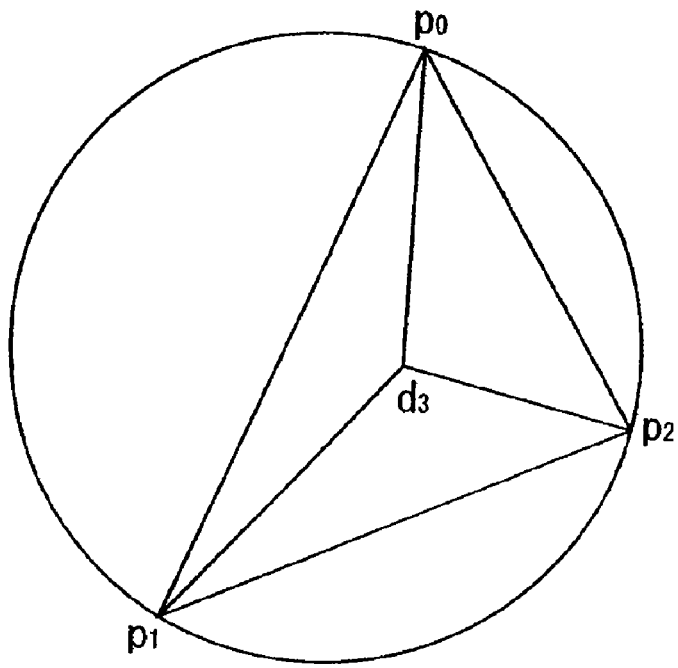
FIG. 10 is a schematic diagram of an embodiment of the present invention.

First, a description is given of the 3-point selection condition from the first point of view used at step S222. In this embodiment, the distortion of the triangle having vertices corresponding to the 3 points having components corresponding to the magnetic data as candidates for selection from a regular triangle is estimated from eigenvalues of a symmetric matrix of 3 rows and 3 columns expressed using the sum of vectors starting from a centroid $d_3$ of the triangle and ending with the vertices as shown in FIG. 10. The centroid $d_3$ of the triangle is obtained from Equation (5).

$$d_3 = \frac{1}{3}(p_0 + p_1 + p_2) \qquad (5)$$

The 3-point selection condition derived from the first point of view is that the ratio of an intermediate eigenvalue $\lambda_{A2}$ of the eigenvalues $\lambda_{A1}$, $\lambda_{A2}$, and $\lambda_{A3}$ of a symmetric matrix A defined by Equation (6) to the maximum eigenvalue $\lambda_{A1}$ is equal to or greater than a predetermined threshold $E_0$.

$$A = \sum_{i=0}^{2} (p_i - d_3)(p_i - d_3)^T \quad (6)$$

In the specification, any vector notation normally indicates a column vector, and a vector notation with suffix "T" indicates a transposed vector (i.e., row vector).

Equation (6) may also be written as Equation (7) using $p_i=(p_{ix},p_{iy},p_{iz})$, $d_3=(d_{3x},d_{3y},d_{3z})$.

$$A = \begin{pmatrix} a_{11} & a_{12} & a_{13} \\ a_{12} & a_{22} & a_{23} \\ a_{13} & a_{23} & a_{33} \end{pmatrix} \quad (7)$$

Entries of this matrix A are expressed by the following equations.

$$a_{11} = \sum_{i=0}^{2} (p_{ix} - d_{3x})^2 \quad (8)$$

$$a_{12} = \sum_{i=0}^{2} (p_{ix} - d_{3x})(p_{iy} - d_{3y}) \quad (9)$$

$$a_{13} = \sum_{i=0}^{2} (p_{ix} - d_{3x})(p_{iz} - d_{3z}) \quad (10)$$

$$a_{22} = \sum_{i=0}^{2} (p_{iy} - d_{3y})^2 \quad (11)$$

$$a_{23} = \sum_{i=0}^{2} (p_{iy} - d_{3y})(p_{iz} - d_{3z}) \quad (12)$$

$$a_{33} = \sum_{i=0}^{3} (p_{iz} - d_{3z})^2 \quad (13)$$

All the eigenvalues are nonnegative real numbers from the definition of the symmetric matrix A. The minimum eigenvalue $\lambda_{A3}$ is 0 when no calculation error is considered. The 3-point selection condition derived from the first point of view is that an estimation $E_A$ defined by Equation (14) satisfies $E_A \geq E_0$ for the threshold $E_0$ as described above.

$$E_A = \frac{\lambda_{A2}}{\lambda_{A1}} \quad (14)$$

The distortion of the triangle having vertices corresponding to the 3 points having components corresponding to the magnetic data as candidates for selection from a regular triangle is defined based on the variation between inner angles of the triangle, the variation between the lengths of the sides of the triangle, the variation between distances of the vertices from the centroid of the triangle, and the like. These variations can be defined by the estimation $E_A$ expressed using the eigenvalues of the symmetric matrix A as described above. Accordingly, the 3-point selection condition derived from the first point of view may be called "triangle condition" that the variation between inner angles of a triangle having vertices corresponding to the 3 points having components corresponding to the magnetic data as candidates for selection, the variation between the lengths of the sides of the triangle, or the variation between distances of the vertices from the centroid of the triangle is within a predetermined range.

If the 3-point condition derived from the first point of view is not satisfied, it is determined whether or not the reset counter has fully counted up (S224). If the reset counter has not fully counted up, the CPU 40 returns to step S216 to repeat the procedure described above. Specifically, the CPU 40 repeats the procedure for updating the data structures $p_0$, $p_1$, and $p_2$ to use the last magnetic data stored in the buffer as a new candidate for selection. If the reset counter has fully counted up, the CPU 40 returns to step S200 to reset all the data structures $p_0$, $p_1$, and $p_2$ and the buffer since the selection up to the 3rd point may never be completed for some reason such as a rapid change in the magnetic field in which the mobile phone 3 is present immediately after the tentative determination of the candidate for selection of the second point.

Selection Verification

If the 3-point selection condition derived from the first point of view is satisfied, the magnetic data selected from the first point of view is verified from the second point of view (S226). In this process, a radius of a circle passing through the 3 points having components corresponding to the magnetic data as candidates for selection is calculated as described above. Although there are a variety of known methods for calculating the radius, this embodiment employs a method that uses eigenvectors of the symmetric matrix A in order to reduce the total amount of calculation and increase the processing speed. The total amount of calculation is reduced when this method is employed and a Jacobi method is also used to calculate the eigenvalues of the symmetric matrix A. The following is a detailed description of the selection verification method.

If $p_0$, $p_1$, and $p_2$ are rewritten with a coordinate system with bases corresponding to the eigenvectors of the matrix A, the component of an eigenvector $l_{A3}$ for the minimum eigenvalue $\lambda_{A3}$ of each point has a constant value. Accordingly, a circle equation can be obtained using simultaneous linear equations if the points are regarded as 3 points on a 2D space while considering only the components of an eigenvector $l_{A1}$ for the maximum eigenvalue $\lambda_{A1}$ and an eigenvector $l_{A2}$ for the intermediate eigenvalue $\lambda_{A2}$, which have all been normalized to size 1. The following is a further detailed description.

First, a matrix L is defined by Equation (15). The matrix L is obtained in a procedure in which the above-mentioned eigenvalues of the symmetric matrix A are calculated using the Jacobi method.

$$L=[l_{A1} l_{A2} l_{A3}] \quad (15)$$

Linear transformation of Equation (16) is applied to each point $p_i$ ($0 \leq i \leq 2$), where the third component of the transformed point $p'_i$ is disregarded and only the first and second components of the transformed point $p'_i$ are used.

$$p'_i = L^T p_i \quad (16)$$

Accordingly, Equation (17) is derived. Since the third term on the right-hand side of Equation (17) can be disregarded, a circle passing through 3 points $p''_0=(p'_{01}, p'_{02})$, $p''_1=(p'_{11}, p'_{12})$, and $p''_2=(p'_{21}, p'_{22})$ in a 2D space is consequently obtained.

$$p'_i = p'_{i1} l_{A1} + p'_{i2} l_{A2} + p'_{i3} l_{A3} \quad (17)$$

When the center point of the circle is expressed by $c''_3 = (c'_{31}, c'_{32})$, simultaneous linear equations for obtaining the center point are expressed by Equation (18).

$$\begin{bmatrix} p'_{01} & p'_{02} & 1 \\ p'_{11} & p'_{12} & 1 \\ p'_{21} & p'_{22} & 1 \end{bmatrix} \begin{bmatrix} c'_{31} \\ c'_{32} \\ x'_{3r} \end{bmatrix} = \frac{1}{2} \begin{bmatrix} p'^2_{01} + p'^2_{02} \\ p'^2_{11} + p'^2_{12} \\ p'^2_{21} + p'^2_{22} \end{bmatrix} \quad (18)$$

Although there is no need to use the value $c'_{3r}$ afterwards, the value is added to establish three linear simultaneous equations. Finally, the radius $r_3$ is determined as the Euclidean distance between $c'_3$ and $p'_0$ calculated by Equation (19).

$$r_3 = \|c'_3 - p'_0\|_2 \quad (19)$$

If the radius of the circle passing through the 3 points having components corresponding to the 3 magnetic data satisfying the 3-point selection condition, which has been obtained as described above, is within a range of values $r_{min}$ to $r_{max}$, it is determined that verification of the three point selection is successful. Otherwise, it is determined that verification of the three point selection is unsuccessful and the CPU 40 returns to step S200 to reset the buffer and the data structures $p_0$, $p_1$, and $p_2$.

2-5. Selection of 4th Point

Overview

Figure 11:
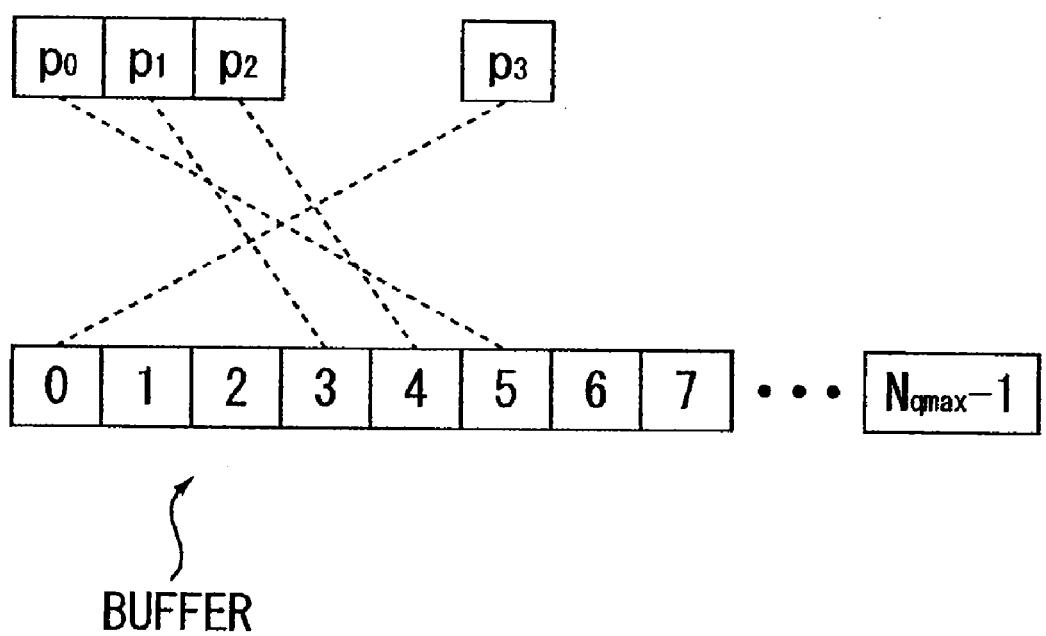
FIG. 11 is a schematic diagram of an embodiment of the present invention.

Upon selection of the 3rd point through the above procedure, the 3 points, which are sufficiently spread over the circumference of a sufficiently large truncation of the finally obtained orientation sphere, are selected. An equation of a spherical surface passing through the 4 points can be obtained using magnetic data having components corresponding to a point not present on a plane including the 3 points. However, randomly selecting the 4th point does not reduce the offset error. Thus, this embodiment performs selection of the optimal 4th point from a plurality of candidates for selection of the 4th point in order to reduce the offset error. Specifically, the selection is performed using all magnetic data stored in the buffer as the candidates for selection of the 4th point. If a blank remains in the buffer, the selection of the 4th point is not performed until data is filled in all the blanks (S228). During the procedure in which the 4th point is selected, magnetic data that has not been determined as any candidate for selection of up to the 3rd point can be sequentially subjected to selection as a candidate for selection of the 4th point as shown in FIG. 11. Such magnetic data includes magnetic data that has been discarded although it was tentatively determined as a candidate for selection. In FIG. 11, identifiers assigned to magnetic data to manage the order in which the magnetic data is input to the buffer are shown by numerals 0 to $N_{qmax}-1$. As illustrated in FIG. 11, the smaller the numeral is, the earlier the magnetic data stored in the data structure has been input to the buffer.

4-Point Selection Condition

Figure 12:
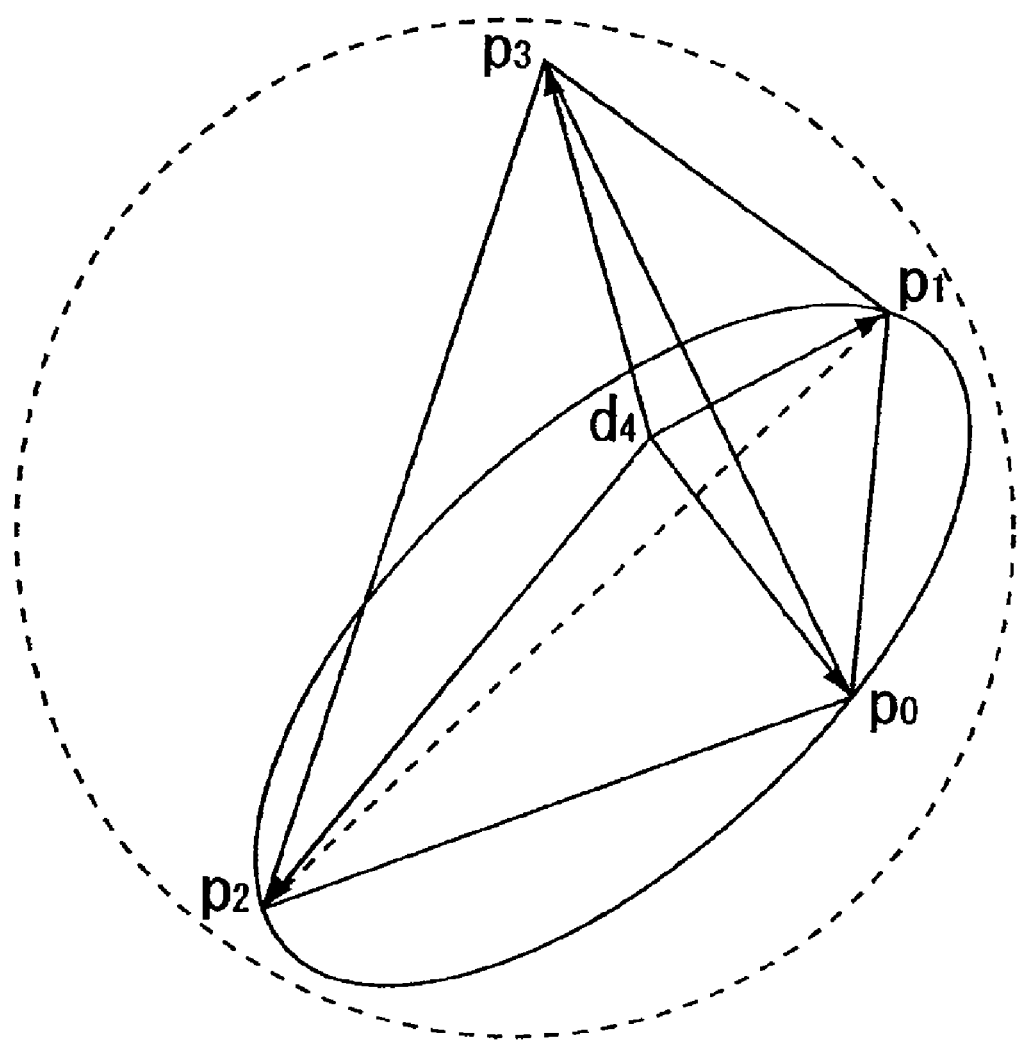
FIG. 12 is a schematic diagram of an embodiment of the present invention.

At step S230, the 4th point is selected in the following manner. All magnetic data stored in the buffer is combined, one by one, with magnetic data having components corresponding to the already selected 3 points. It is then determined, sequentially for each 4 magnetic data, whether or not the 4 magnetic data satisfies a 4-point selection condition. Magnetic data with the highest estimation from among a plurality of magnetic data stored in the buffer, which satisfies the 4-point selection condition, is selected as that of the 4-th point. The 4-point selection condition for selecting the 4th point may be called "tetrahedron" condition such that 4 points having components corresponding to magnetic data as candidates for selection are sufficiently spread over a spherical surface passing through the 4 points, i.e., that a tetrahedron shown in FIG. 12, which has vertices corresponding to the 4 points, is close to a regular tetrahedron. Accordingly, the distortion of the tetrahedron having the vertices corresponding to the 4 points having the components corresponding to the magnetic data as candidates for selection from the regular tetrahedron is calculated. The distortion of the tetrahedron from the regular tetrahedron can be defined based on the variation between solid angles of the tetrahedron, the variation between the areas of the surfaces of the tetrahedron, the variation between distances of the vertices from the centroid of the tetrahedron, and the like. These variations are estimated from eigenvalues of a symmetric matrix of 3 rows and 3 columns expressed using the sum of vectors starting from a centroid $d_4$ of the tetrahedron and ending with the vertices. The centroid $d_4$ of the tetrahedron is obtained by Equation (20).

$$d_4 = \frac{1}{4}(p_0 + p_1 + p_2 + p_3) \quad (20)$$

A symmetric matrix B is defined as follows.

$$B = \sum_{i=0}^{3}(p_i - d_4)(p_i - d_4)^T \quad (21)$$

where $p_i$ (i=0, 1, 2, 3) denotes each vertex of the tetrahedron and $d_4$ denotes a centroid of the tetrahedron.

As the ratio of the minimum eigenvalue $\lambda_{B1}$ of the symmetric matrix B to the maximum eigenvalue $\lambda_{B3}$ increases, the distortion of the tetrahedron from the regular tetrahedron decreases, i.e., all the variation between solid angles of the tetrahedron, the variation between the areas of the surfaces of the tetrahedron, and the variation between distances of the vertices from the centroid of the tetrahedron decrease. Accordingly, the 4-point selection condition is that $E_{B1}$ obtained by Equation (22) is maximized.

$$E_{B1} = \frac{\lambda_{B3}}{\lambda_{B1}} \quad (22)$$

$E_{B1}$ is calculated for every magnetic data stored in the buffer. When the maximum value of $E_{B1}$ is determined, magnetic data of the 4th point, which maximizes $E_{B1}$, is stored as a final candidate for selection in the data structure $p_3$. Another estimation $E_{B2}$ is obtained by Equation (23) for the data structures $p_0$, $p_1$, $p_2$, and $p_3$ in which magnetic data determined as final candidates for selection of up to the 4th point is stored.

$$E_{B2} = \frac{\lambda_{B3}}{\lambda_{B2}} \quad (23)$$

"$\lambda_{B2}$" denotes an intermediate eigenvalue of the symmetric matrix B. When Inequalities (24) are not satisfied for predetermined thresholds $E_2$ and $E_3$, there is a risk that a large error occurs when obtaining the spherical surface equation and therefore the CPU 40 returns to step S200 to reset all the data structures $p_0$, $p_1$, $p_2$, and $p_3$ and the buffer. When Inequalities (24) are satisfied, the candidate for selection of the 4th point is finally selected.

$$\begin{cases} E_{B1} > E_2 \\ E_{B2} > E_3 \end{cases} \quad (24)$$

Instead of performing the 4th point selection using a single combination of the 2 thresholds, more than one combination of the two thresholds may be set so that all the data structures $p_0$, $p_1$, $p_2$, and $p_3$ and the buffer are reset when Inequalities (25) are not satisfied for every i. This is more effective in reducing calibration failures.

$$\begin{cases} E_{B1} > E_{2i} \\ E_{B2} > E_{3i} \end{cases} (i = 0, 1, \dots) \quad (25)$$

Calculation of Orientation Sphere

When the magnetic data of up to the 4th point has been selected through the above procedure, i.e., when $p_0$, $p_1$, $p_2$, and $p_3$ are determined, the center point and the radius of the orientation sphere are obtained (S232). The center point "$c_4 = (c_{4x}, c_{4y}, c_{4z})$" of the orientation sphere is obtained by the following equation. Although the value $c_{4r}$ is not used afterwards, the value is added to establish four linear simultaneous equations.

$$\begin{bmatrix} p_{0x} & p_{0y} & p_{0z} & 1 \\ p_{1x} & p_{1y} & p_{1z} & 1 \\ p_{2x} & p_{2y} & p_{2z} & 1 \\ p_{3x} & p_{3y} & p_{3z} & 1 \end{bmatrix} \begin{bmatrix} c_{4x} \\ c_{4y} \\ c_{4z} \\ c_{4r} \end{bmatrix} = \frac{1}{2} \begin{bmatrix} p_{0x}^2 + p_{0y}^2 + p_{0z}^2 \\ p_{1x}^2 + p_{1y}^2 + p_{1z}^2 \\ p_{2x}^2 + p_{2y}^2 + p_{2z}^2 \\ p_{3x}^2 + p_{3y}^2 + p_{3z}^2 \end{bmatrix} \quad (26)$$

The radius r of the orientation sphere is determined as the Euclidean distance between $c_4$ and $p_0$ by Equation (27).

$$r = \|c_4 - p_0\|_2 \quad (27)$$

Verification of Orientation Sphere

At step S234, the adequacy of the calculated orientation sphere is verified. When the radius of the orientation sphere is not within a predetermined range, the center point of the calculated orientation sphere is not adopted as an offset and the CPU 40 returns to step S200 to reset all the data structures $p_0$, $p_1$, $p_2$, and $p_3$ and the buffer.

In this embodiment, the adequacy of the orientation sphere is verified using not only the 4 selected magnetic data but also all or part of the magnetic data stored in the buffer. This verification is not an indispensable process although it is effective to some degree in reducing the variation of the offset error. In this verification, an estimation S is obtained by Equation (28). If $S > S_t$ for a predetermined threshold $S_t$, the center point of the calculated orientation sphere is not adopted as an offset and the CPU 40 returns to step S200 to reset all the data structures $p_0$, $p_1$, $p_2$, and $p_3$ and the buffer. Otherwise, the center point is set as an offset in the following manner.

$$S = \frac{1}{N_{qmax}} \frac{1}{r^2} \sum_{q_i \in Q} \{\|q_i - c_4\|_2 - r\}^2 \quad (28)$$

Offset Setting

If the calculated orientation sphere is true, the center point is set as an offset at step S236. Specifically, components of the center point of the calculated orientation sphere are set as components of the offset.

B. SECOND EMBODIMENT

When magnetic data input to the magnetic sensor control device is selected and stored in the buffer, the first embodiment focuses on distances between points having components corresponding to the magnetic data $q_0, q_1, \dots q_{Nqmax-1}$, stored in the buffer. However, in the first embodiment, selection of the 3rd and 4th points using a method that changes the direction of the moving body may be unsuccessful, thus failing to determine the offset. In addition, the first embodiment does not exclude the possibility that magnetic data corresponding to only two-dimensionally distributed points, i.e., only points at small distances from a specific plane, is stored in the buffer. An offset obtained from magnetic data corresponding to two-dimensionally distributed points is liable to have a large error from the true offset. Instead of using the method of changing the moving body, the second embodiment of the present invention changes the method of selecting the first two points as described below in order to calculate an offset with a small error from the true offset even if magnetic data corresponding to only points at small distances from a specific plane is stored in the buffer.

Figure 13:
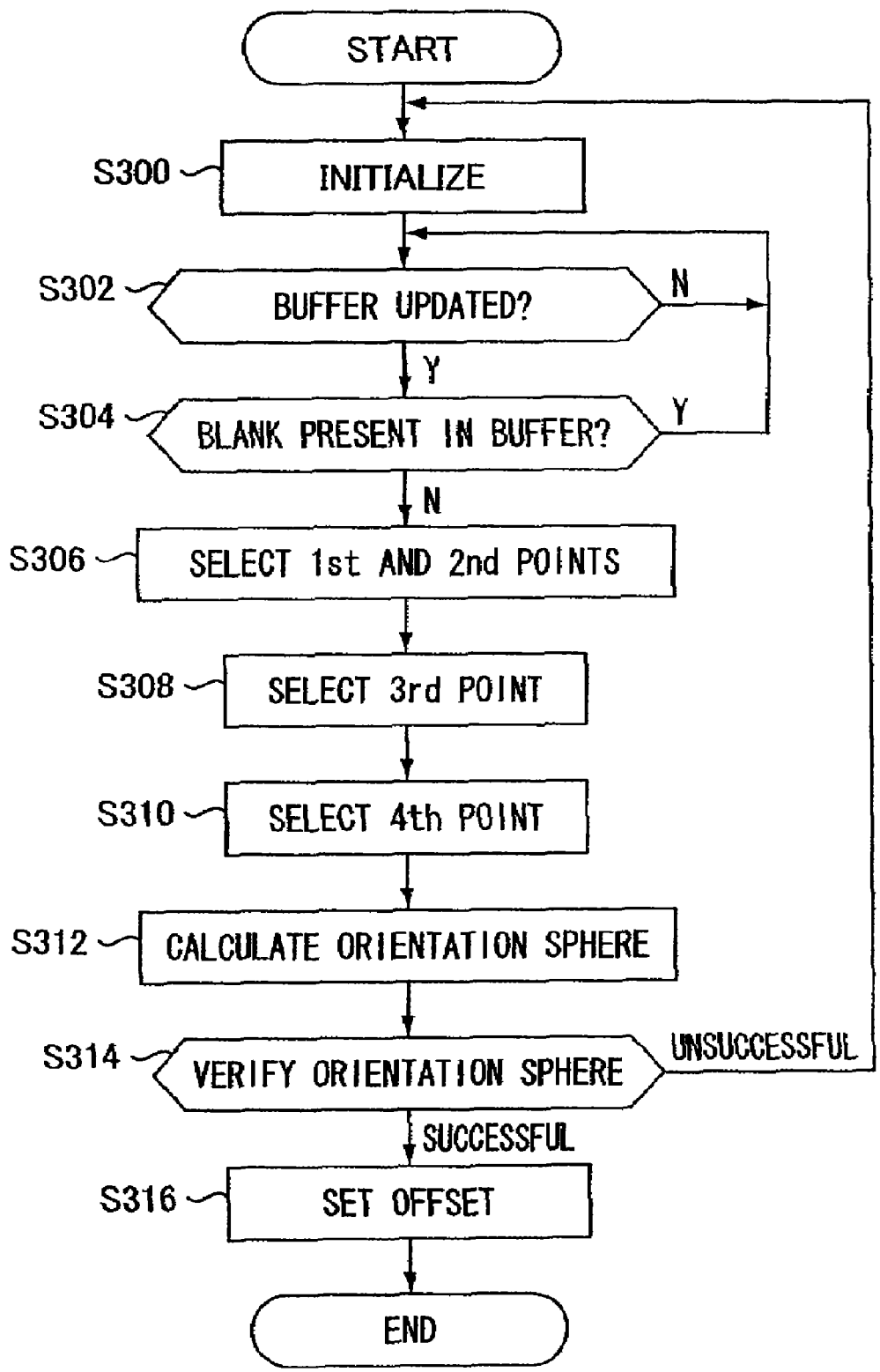
FIG. 13 is a flow chart of an embodiment of the present invention.

FIG. 13 is a flow chart of an offset setting procedure according to the second embodiment of the present invention. The CPU 40 performs the procedure of FIG. 13 by executing the buffer setting module 94 when an offset setting request has been made. In addition, in the same manner as the first embodiment, when a procedure described below is performed by executing the offset setting module 94, the procedure using the buffer management module 92 is performed in parallel in a multitasking environment.

At step S300, initialization is performed to discard all candidates for selection. Specifically, four data structures $p_0$, $p_1$, $p_2$, and $p_3$ used to store candidates for selection, which are declared by the offset setting module 94, are reset and the buffer is also initialized.

At step S302, the CPU 40 waits until the buffer is updated. Once the buffer is updated, it is determined whether or not there is a blank in the buffer, i.e., whether or not the number of data stored in the buffer is a predetermined number $N_{qmax}$ (S304). The procedure of steps S302 and 304 is repeated until the number of data stored in the buffer reaches the predetermined number $N_{qmax}$. In this manner, this embodiment does not select any magnetic data until $N_{qmax}$ magnetic data is stored in the buffer.

Once the $N_{qmax}$ magnetic data is stored in the buffer, magnetic data of the first and second points is selected (S306). A data sequence of $N_{qmax}$ magnetic data stored in the buffer is denoted by "$q_0, q_1, \dots q_{Nqmax-1}$" and a set of $\{qi | 0 \leq i \leq N_{qmax} - 1\}$ is denoted by "Q", and points having components corresponding to the magnetic data "$q_0, q_1, \dots q_{Nqmax-1}$" are then referred to as data points "$q_0, q_1, \dots q_{Nqmax-1}$". In the same manner as the first embodiment, the magnetic data is stored such that the set Q is not a multiset.

To obtain a highly accurate offset from the set Q of points which concentrate on or around a specific plane, it is required that magnetic data corresponding to two points most distant from each other along a specific direction be selected. It is most reasonable that two points most distant from each other along a direction perpendicular to the plane near which the points of the set Q are distributed are selected. However, selecting two points most distant from each other along a randomly determined direction is also very effective on average. The following is a detailed selection method.

Let $p_0$ be a data point $q_i$ which maximizes the inner product D of a vector "a" having a specific direction and magnitude and a vector starting from the centroid $d_N$ of the data points $q_0$, $q_1, \ldots q_{Nqmax-1}$ and ending with each data point and let $p_1$ be a data point $q_i$ which minimizes the inner product D. The centroid $d_N$ of the data points $q_0, q_1, \ldots q_{Nqmax-1}$ is obtained by Equation (29). The inner product D of the vector "a" and the vector starting from the centroid $d_N$ of the data points $q_0$, $q_1, \ldots q_{Nmax-1}$ and ending with the data point $q_i$ is obtained by Equation (30).

$$d_N = \frac{1}{N_{qmax}} \sum_{q_i \in Q} q_i \quad (29)$$

$$Di = a \cdot (q_i - d_N) \quad (30)$$

$D_i$ is obtained by sequentially substituting elements of the set Q into $q_i$ of Equation (30) and a data point $q_i$ maximizing $D_i$ is set as $p_0$ and a data point $q_i$ minimizing $D_i$ is set as $p_1$, thereby selecting two data points which maximize the distance between feet of perpendiculars dropped from the two data points onto a straight line parallel to the vector "a". In this embodiment, the two selected data points are not replaced with other data points unless the set Q is destroyed. That is, an offset calculated based on 4 magnetic data, which must include the two selected magnetic data, is set in this embodiment. This makes it possible to calculate an offset with a small error from the true offset even if magnetic data corresponding to points at small distances from a specific plane are stored in the buffer.

However, when points of a set Q concentrate on or around a specific plane, all magnetic data stored in the buffer may be destroyed and then a set Q may be again stored in the buffer. Whether or not points of a set Q concentrate on or around a specific plane is determined in the following manner.

When the data points $q_0, q_1, \ldots q_{Nqmax-1}$ of the set Q concentrate on or around a specific plane, the ratio $\lambda_{C3}/\lambda_{C1}$ of the minimum eigenvalue $\lambda_{C3}$ of a matrix C, which is expressed by Equation (31) using the centroid $d_N$ of the data points $q_0, q_1, \ldots q_{Nqmax-1}$, to the maximum eigenvalue $\lambda_{C1}$ is small. When points of a set Q completely concentrate on a specific plane, the ratio $\lambda_{C3}/\lambda_{C1}$ is 0. Therefore, the ratio $\lambda_{C3}/\lambda_{C1}$ is compared with a predetermined value and, if the ratio $\lambda_{C3}/\lambda_{C1}$ is less than the predetermined value, it is determined that the points of the set Q concentrate on or around the specific plane.

$$C = \sum_{q_i \in Q} (q_i - d_N)(q_i - d_N)^T \quad (31)$$

When the points of the set Q concentrate on or around a specific plane, it is most reasonable, as described above, that two points most distant from each other along a direction perpendicular to the plane are selected. When the points of the set Q completely concentrate on a specific plane, the eigenvector of the minimum eigenvalue $\lambda_{C3}$ of the matrix C is identical to a normal vector to the plane. Also when the points of the set Q concentrate on or around a specific plane, the eigenvector of the minimum eigenvalue $\lambda_{C3}$ of the matrix C is almost identical to a normal vector to the plane. Therefore, it is preferable that the above-mentioned vector "a" having a specific direction and magnitude be the eigenvector of the minimum eigenvalue $\lambda_{C3}$ of the matrix C.

At step S308, the 3rd point is selected. Specifically, the estimation $E_A$ described above at step S222 of the first embodiment is calculated under the assumption that a data point $q_i$, which has not been selected as any of $p_0$ and $p_1$ among the elements of the set Q, is $p_2$ and then a data point $q_i$ which maximizes the estimation $E_A$ is selected as $p_2$. Then, $p_0$, $p_1$, and $p_2$ may be verified from the second point of view described at step S226 of the first embodiment and, if the verification is unsuccessful, the CPU 40 may return to step S300 to reset the buffer.

At step S310, the 4th point is selected in the same manner as step S230 of the first embodiment.

At step S312, an orientation sphere is calculated in the same manner as step S232 of the first embodiment.

At step S314, the orientation sphere is verified in the same manner as step S234 of the first embodiment.

At step S316, an offset is set in the same manner as step S236 of the first embodiment.

Now the second aspect of the present invention will be described hereafter in the following order.

A. FIRST EMBODIMENT

[1. Overview]
1-1. Basic Principle
1-2. Hardware Structure
1-3. Software Structure
[2. Procedure]
2-1. Buffer Update
2-2. Tentative Determination of Candidate for Selection of 1st Point
2-3. Tentative Determination of Candidate for Selection of 2nd Point
2-4. Tentative Determination of 3 Points
3-Point Update
3-Point Selection Condition
Selection Verification
Offset Setting

B. SECOND EMBODIMENT

[1. Overview]
1-1. Basic Principle

First, a basic principle of the first embodiment is described. This embodiment sets an offset to negate magnetization components of a moving body and inherent measurement errors included in an output of a 2D magnetic sensor provided in the moving body. To obtain the offset, this embodiment specifies a circle which approximates a set of points in a vector plane having components corresponding to magnetic data output from the 2D magnetic sensor. This circle will be referred to as an orientation circle. The components of the center point of the orientation circle correspond to the offset and the radius of the orientation circle corresponds to the intensity of the magnetic field. Calibration using the 2D magnetic sensor requires magnetic data collected when a moving body including the 2D magnetic sensor is rotated about its rotation axis with the direction of the rotation axis uniformly maintained parallel to the vertical direction. Since there is an inherent measurement error in the output of the 2D magnetic sensor, a set of points having components corresponding to the magnetic data does not constitute a circle even if the moving body on which the 2D magnetic sensor is mounted is rotated about an axis perpendicular to two sensitive directions of its x and y-axis sensors in a constant magnetic field. In this embodiment, 3 points having components corresponding to the magnetic data are selected and the center point and radius of a circle passing through the 3 selected points is obtained from the 3 points, and the center of the obtained circle is set as an offset. When using this method to reduce an error included in the offset due to an inherent measurement error of the 2D magnetic sensor, it is important to select 3 points having components corresponding to 3 magnetic data including the inherent measurement error such that the 3 selected points are distributed evenly over a wide range on a circle passing through the 3 points.

FIGS. 2A and 2B are again used to describe the second aspect of the invention. FIGS. 2A and 2B show the relationship between an orientation circle (shown by a solid line) passing through 3 points having components corresponding to magnetic data output from a 2D magnetic sensor and a true orientation circle (shown by a dashed line) which is a set of an infinite number of points having components corresponding to magnetic data of an ideal 2D magnetic sensor with no measurement error. When 3 points having components corresponding to magnetic data of the 2D magnetic sensor are distributed over a narrow range along the circumference of a circle passing through the 3 points, the distance between a center (x) of the orientation circle obtained from the 3 points and a center (+) of the true orientation circle of the ideal 2D magnetic sensor, which is to be obtained, is large as shown in FIG. 2A. On the other hand, when 3 points having components corresponding to magnetic data of the 2D magnetic sensor are distributed over a wide range along the circumference of a circle passing through the 3 points, the distance between a center (x) of the orientation circle obtained from the 3 points and a center (+) of the true orientation circle of the ideal 2D magnetic sensor, which is to be obtained, is small as shown in FIG. 2B. The offset error can be minimized when 3 points having components corresponding to magnetic data of the 2D magnetic sensor are distributed at regular intervals along the circumference of a circle passing through the 3 points, i.e., when a triangle having vertices corresponding to the 3 points is a regular triangle. Accordingly, this embodiment selects 3 points having components corresponding to magnetic data such that the distortion of a triangle having vertices corresponding to the 3 points from a regular triangle is less than a specific threshold.

Here, we compare a method of this embodiment in which 3 points are selected in advance, a circle passing through the 3 selected points is obtained, and an offset is obtained from the circle with a method in which a circle which approximates a set of 4 or more points is obtained using a statistical technique and an offset is obtained from the circle. In the method using a statistical technique, if points having components corresponding to magnetic data are unevenly distributed or if peculiar magnetic data is included in a statistical population, the center of an orientation circle obtained from these points is significantly deviated from the center of the true orientation circle. Accordingly, to reduce the offset error using the statistical technique, it is necessary to verify the variation of a statistical population used to obtain the orientation circle using the statistical technique or to select a statistical population. In the method of this embodiment, without using the statistical technique requiring a large amount of calculation, it is possible to obtain an offset with an accuracy not less than the accuracy of an offset obtained through the method using the statistical technique if 3 suitable points can be selected.

1-2. Hardware Structure

Figure 15:
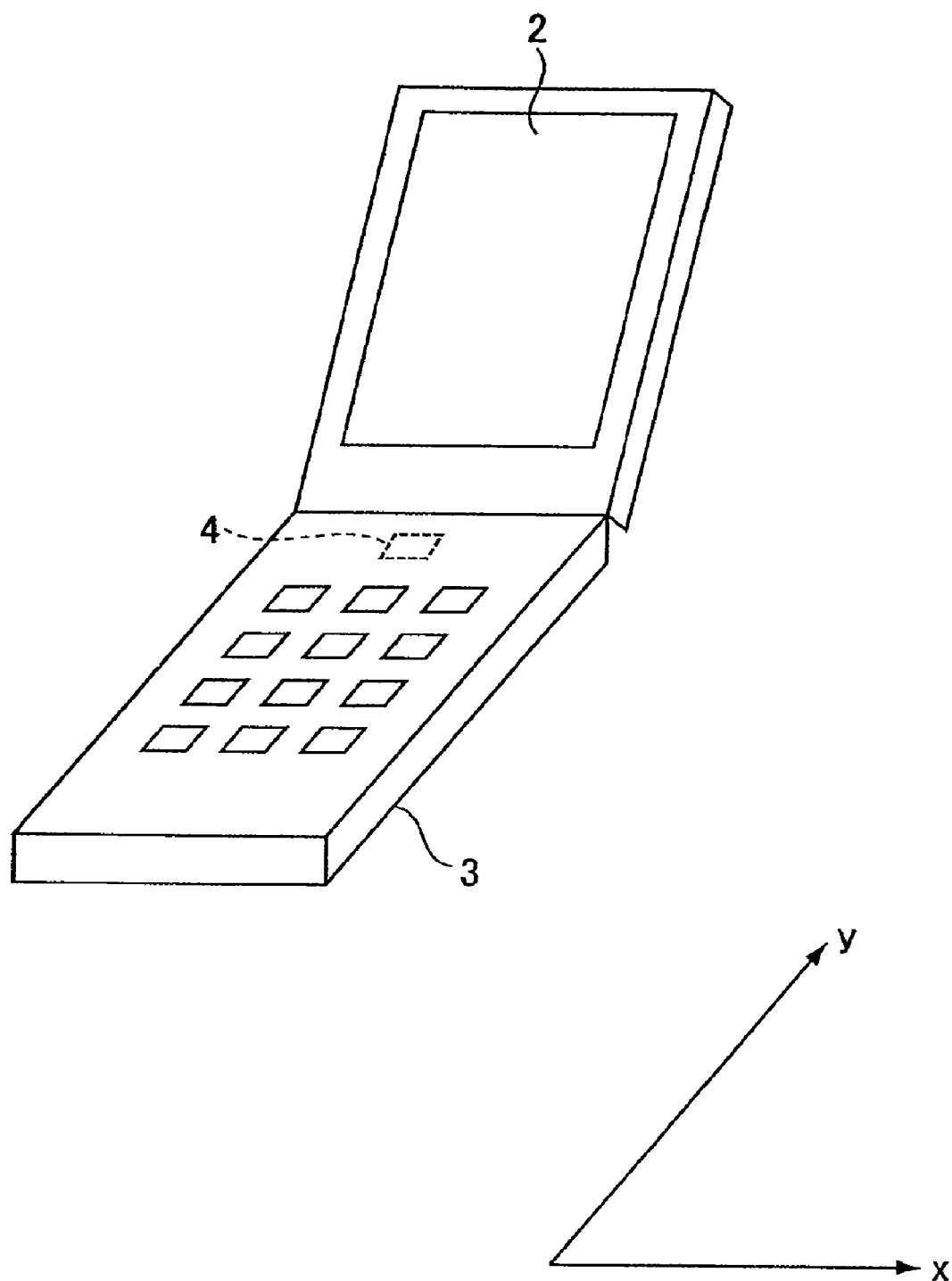
FIG. 15 is a schematic diagram of an embodiment of the present invention of the second aspect.

FIG. 15 is a schematic diagram of an external appearance of a mobile phone 3 that is an example of a moving body to which the present invention is applied. The mobile phone 3 includes a 2-dimensional (2D) magnetic sensor 4. The 2D magnetic sensor 4 detects the direction and intensity of a magnetic field by detecting vector components of the magnetic field in two orthogonal directions (x, y). A display 2 of the mobile phone 3 displays a variety of character or image information. For example, the display 2 displays a map and an arrow or characters representing the orientation (azimuth).

Figure 16:
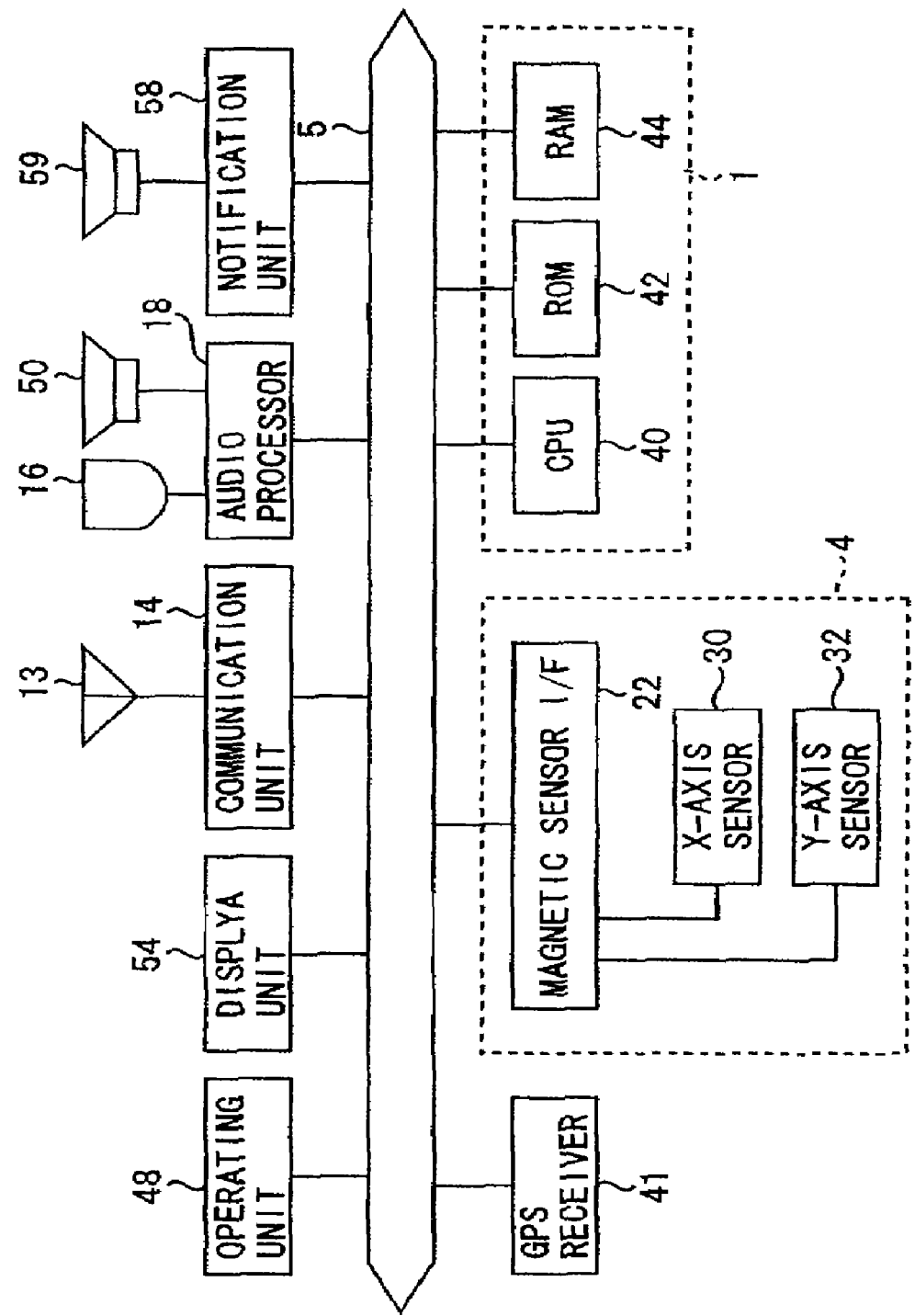
FIG. 16 is a block diagram of an embodiment of the present invention.

FIG. 16 is a block diagram of a hardware structure of a mobile phone 3 having a magnetic measurement apparatus, including a 2D magnetic sensor 4 and a magnetic sensor control device 1, to which the present invention is applied. The 2D magnetic sensor 4 includes x and y-axis sensors 30 and 32 that are provided in a variety of moving bodies to detect x and y direction components of a magnetic field vector due to terrestrial magnetism. Each of the x and y-axis sensors 30 and 32 includes a magnetic resistance element, a hall sensor, or the like, which may be any type of 1-dimensional magnetic sensor provided that it has directivity. The x and y-axis sensors 30 and 32 are fixed so that their sensitive directions are perpendicular to each other. Outputs of the x and y-axis sensors 30 and 32 are time-divided and input to a magnetic sensor interface (I/F) 22. The magnetic sensor interface 22 analog-to-digital converts inputs from the x and y-axis sensors 30 and 32 after amplifying the inputs. Digital magnetic data output from the magnetic sensor interface 22 is input to the magnetic sensor control device 1 through a bus 5.

The magnetic sensor control device 1 is a computer including a CPU 40, a ROM 42, and a RAM 44. The CPU 40 controls overall operations of a moving body such as the mobile phone 3. The ROM 42 is a nonvolatile storage medium which stores a magnetic sensor control program or a variety of programs (for example, a navigation program) used to implement functions of the moving body, which are executed by the CPU 40. The RAM 44 is a volatile storage medium which temporarily stores data to be processed by the CPU 40. The magnetic sensor control device 1 and the 3D magnetic sensor 4 may be constructed as a one-chip magnetic measurement apparatus.

An antenna 13 and a communication unit 14 are circuits for performing communication between the mobile phone 3 and a base station.

An audio processor 18 is a circuit for performing AD conversion of an analog audio signal input from a microphone 16 and DA conversion to output an analog audio signal to a speaker 50.

A GPS receiver 41 is a circuit for processing GPS radio signals from GPS satellites and outputting the latitude and longitude of the current position.

An operating unit 48 includes a cursor key and a dial key which doubles as a character input key.

As a display section, a display unit 54 includes a display 2 such as an LCD, a display control circuit (not shown), and the like and displays a variety of screens according to operating modes of the mobile phone 3 on the display 2.

As a notification section, a notification unit 58 includes a sound source circuit (not shown), a ring tone speaker 59, a vibrator, an LED, and the like and notifies the user of the progress of calibration and incoming calls. A corresponding angle or progress bar may be displayed to allow the user to view the progress of calibration.

1-3. Software Structure

FIG. 5 is again used to describe the second aspect of the invention. FIG. 5 is a block diagram of a magnetic sensor control program 90. The magnetic sensor control program 90 is stored in the ROM 42 to provide orientation data to a navigation program 98. The orientation data is 2D vector data representing the orientation of the Earth's magnetic field. As 3D vector data, the orientation data may be provided to the navigation program 98. When the CPU 40 executes the magnetic sensor control program 90, a combination of the CPU 40, the RAM 44, and the ROM 42 functions as a magnetic sensor control device. The magnetic sensor control program 90 is constructed as a group of modules such as a buffer management module 92, an offset setting module 94, and an orientation calculation module 96.

The buffer management module 92 is a program part that stores a plurality of magnetic data sequentially input from the 2D magnetic sensor 4 in a buffer in order to use the magnetic data in offset calculation. The buffer management module 92 allows the CPU 40 to function as an input section. The magnetic data sequentially input from the magnetic sensor 4 may be sequentially subjected to selection and unselected magnetic data may then be discarded. However, if a selection condition of up to the 2nd point and a selection condition of the 3rd point are different, magnetic data may be selected as the 3rd point even if it has not been selected as any of up to the second point. Accordingly, the buffer managed by the buffer management module 92 is used not only to buffer the difference between input and processed times but also to allow magnetic data, which has not been selected once, to be used again as a candidate for selection. This buffer may be embodied not only in hardware but also in software.

The offset setting module 94 is a program part that selects 3 magnetic data from the magnetic data held by the buffer management module 92 and calculates an offset from the 3 selected magnetic data and then sets the calculated offset. The offset setting module 94 allows the CPU 40 to function as selection, calculation, setting, and progress value output sections.

The orientation calculation module 96 is a program part that generates orientation data using both the magnetic data sequentially input from the magnetic sensor 4 and the set offset. Specifically, the orientation calculation module 96 outputs, as orientation data, 2 components obtained by subtracting the components of the offset data from the components of the magnetic data which is 2D vector data.

When a navigation program 98 is activated, the user is informed, for example, that they need to rotate the mobile phone 3 while maintaining the mobile phone 3 oriented horizontally for calibration and the calibration is then initiated. When the calibration is initiated, an offset update request is made and a buffer update process and an offset setting process are performed as described below.

[Procedure]

2-1. Buffer Update

FIG. 6 is again used to describe the second aspect of the invention. FIG. 6 is a flow chart of a buffer update procedure. The CPU 40 performs the procedure of FIG. 6 by executing the buffer management module 92 when an offset update request has been made.

At step S100, a buffer, which stores a plurality of magnetic data used in offset calculation, is initialized. For example, data stored in a buffer area of the RAM 44 is deleted.

At step S102, the CPU 40 waits until new magnetic data is input from the magnetic sensor 4.

When new magnetic data is input from the magnetic sensor 4, the CPU 40 determines whether or not it is necessary to update the buffer (S104). When a plurality of magnetic data is sequentially input from the magnetic sensor 4 with almost no movement of the mobile phone 3, the distance between two points having components corresponding to two sequentially input magnetic data is small. It is not preferable to include two points near each other in 4 points necessary to obtain the offset. In addition, storing a plurality of magnetic data corresponding to components of near points in a buffer with a limited capacity wastes memory resources and causes unnecessary buffer update processes. In the following manner, it is determined whether or not it is necessary to update the buffer. For example, if the distance between a point having components corresponding to the last input magnetic data and a point having components corresponding to magnetic data immediately before the last input magnetic data is less than a given threshold, it is determined that it is unnecessary to update the buffer and the last input magnetic data is discarded without being stored in the buffer. Otherwise, it is determined that it is necessary to update the buffer. As a result, for example when a plurality of magnetic data is input in an order as previously shown in FIG. 7, magnetic data shown by filled circles is not stored in the buffer and magnetic data shown by open circles is stored in the buffer. In FIG. 7, the order in which the plurality of magnetic data is input is denoted by numerals assigned to the open and filled circles.

If the buffer update necessity determination is made according to the following condition in addition to the above determination condition (or criterion), it is possible to increase the probability of success of the calibration. Let "$q_0, q_1, \ldots q_{Nqmax-1}$" be a data sequence of Nqmax data elements stored in the buffer and let "Q" be a set of $\{q_i | 0 \leq i \leq N_{qmax}-1\}$.

Additional Update Condition:

The last magnetic data is stored to update the buffer only if, for a given threshold $q_{min}$, a point q having components corresponding to the magnetic data satisfies "$\|q-q_i\|_2 > q_{min}$" for every i where "$i < N_{qmax-1}$".

If it is determined that it is necessary to update the buffer, the buffer is updated (S106). An algorithm used for this update is, for example, a First-In, First-Out (FIFO) algorithm.

2-2. Tentative Determination of Candidate for Selecting 1st Point

Figure 14:
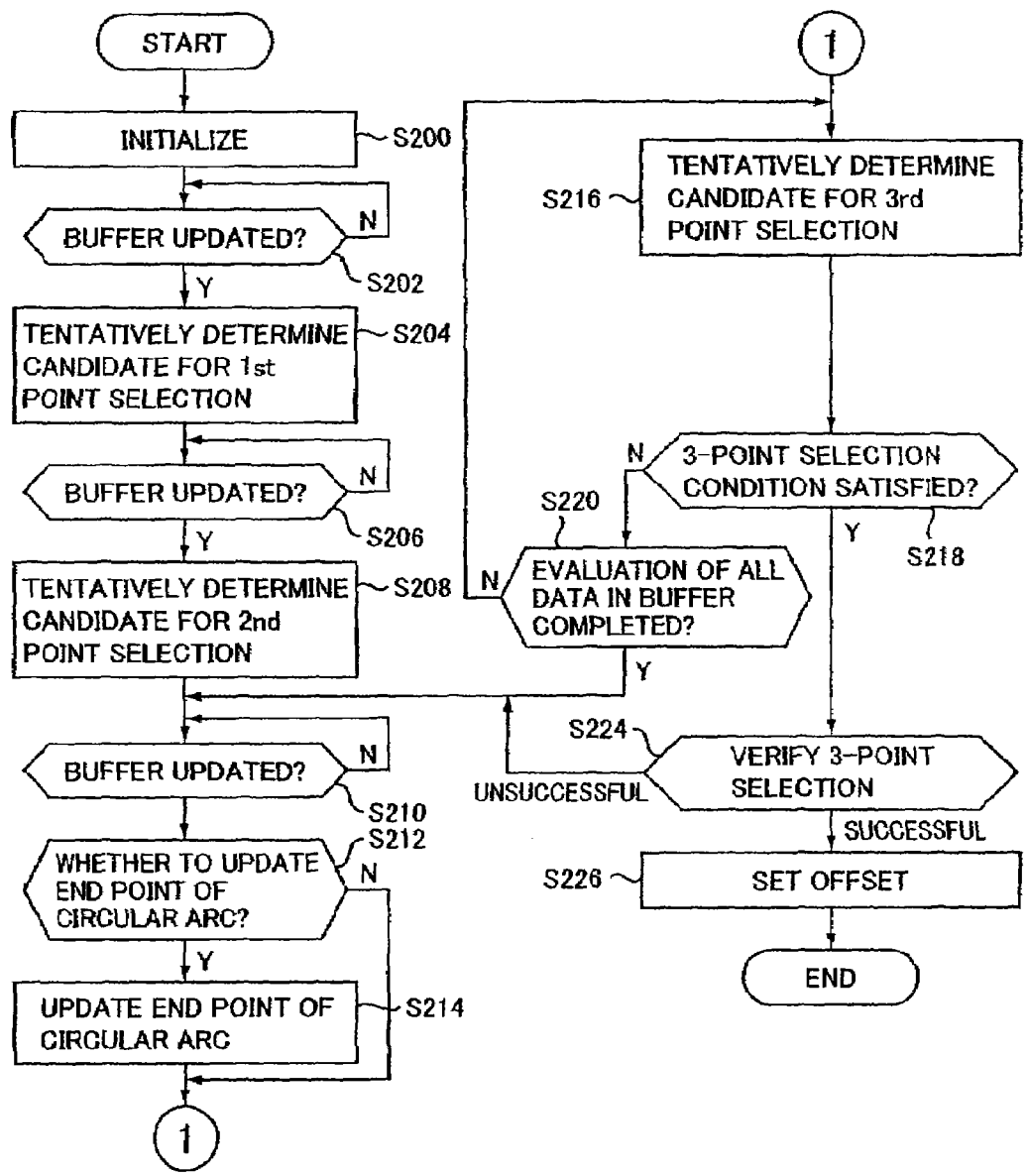
FIG. 14 is a flow chart of an embodiment of the present invention.

FIG. 14 is a flow chart of an offset setting process. The CPU 40 performs the procedure of FIG. 14 by executing the offset setting module 94 when an offset update request has been made. When a procedure described below is performed by executing the offset setting module 94, the procedure using the buffer management module 92 is performed in parallel in a multitasking environment.

At step S200, initialization is performed to discard all candidates for selection. Specifically, 3 data structures $p_0, p_1$, and $p_2$ used to store candidates for selection, which are declared by the offset setting module 94, are reset and the buffer is also initialized. As will be described later, a plurality of magnetic data is stored as candidates for selection in the data structures $p_0, p_1$, and $p_2$ until up to the 3rd point is selected and the offset is set. Each of the data structures $p_0, p_1$, and $p_2$ is a sequence of 2 variables for storing 2 components of each magnetic data.

At step S202, the CPU 40 awaits the buffer update described above.

Once the buffer is updated, a candidate for selection of the first point is tentatively determined (S204). Specifically, the first magnetic data input after the buffer is initialized (S200) is determined to be a candidate for selection of the first point. The candidate for selection of the first point is stored in the data structure $p_0$. The candidate for selection of the first point in this process is just a tentatively determined one since there is a possibility that the data structure $p_0$ used to store the candidate for selection of the first point will be updated as described later.

2-3. Tentative Determination of Candidate for Selecting 2nd Point

At step S206, the CPU 40 waits until the buffer is updated again.

Once the buffer is updated again, a candidate for selection of the second point is tentatively determined (S208). Specifically, the second magnetic data input after the buffer is initialized (S200) is determined to be a candidate for selection of the second point. The candidate for selection of the second point is stored in the data structure $p_1$. The candidate for selection of the second point in this process is also just a tentatively determined one since there is a possibility that the data structure $p_1$ used to store the candidate for selection of the second point will be updated as described later.

2-4. Selection of 3rd Point

Update of 3 Points

At step S210, the CPU 40 waits until the buffer is updated again.

When the buffer is updated again, it is determined at step S212 whether or not to update ends of a circular arc. It is determined which one of the currently stored candidates for selection of the 1st to 3rd points is to be updated with magnetic data that has been last input and last stored in the buffer in order to store the magnetic data as a candidate selected according to the 3 point selection condition (if the selection based on the 3 point selection condition has not been performed, the same procedure is performed although candidates for selection of only up to 2nd point are currently stored). That is, it is determined which one of the data structures $p_0$, $p_1$, and $p_2$ will store magnetic data that has been last input and last stored. This is because the data structures $p_0$, $p_1$, and $p_2$ are defined differently as follows.

3 points having components corresponding to magnetic data stored in the data structures $p_0$, $p_1$, and $p_2$ uniquely specify a circular arc, which passes through the 3 points, provided that they do not lie on the same straight line. The data structures $p_0$ and $p_1$ are defined as data structures which store magnetic data corresponding to components of points at both ends of the circular arc. The data structure $p_2$ is defined as a data structure which stores magnetic data corresponding to components of an intermediate point of the circular arc. Accordingly, it is necessary to determine which one of the data structures $p_0$, $p_1$, and $p_2$ is to be used to store the magnetic data that has been last input and last stored in the buffer in order to store the candidates for selection of up to the 3rd point until the 3rd point is selected.

The following is the reason why the data structures $p_0$, $p_1$, and $p_2$ are defined as described above, The 3 candidate points are positioned on the circumference of an orientation circle that passes through the 3 candidate points. As described above, the more evenly the 3 points used to obtain an orientation circle are distributed over a wide range on its circumference passing through the 3 points, the smaller the error the offset has. Accordingly, the offset error decreases as the length of a chord of a circular arc passing though 3 candidate points increases until it reaches a certain length and the error is great if the length of the chord is too small. Therefore, it is preferable that the candidates for selection of up to the 3rd point be updated each time magnetic data is stored in the buffer so that the length of the chord of the circular arc passing through the 3 candidate points is increased until it reaches a certain length.

Figures 17A, 17B, 17C:
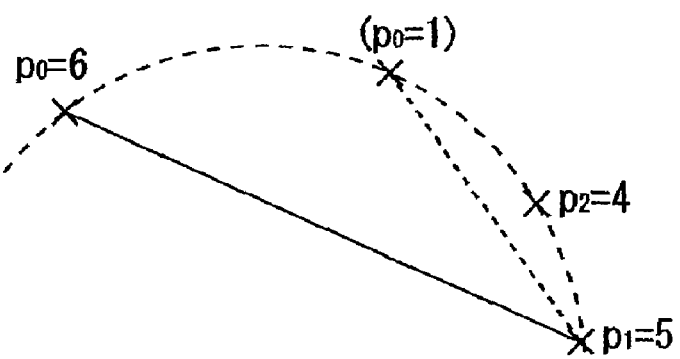
FIGS. 17A, 17B and 17C are a schematic diagram of an embodiment of the present invention.

FIGS. 17A-17C are schematic diagrams illustrating update of 3 candidate points. Here, it is assumed that magnetic data as shown in FIG. 17B has been stored in data structures $p_0$, $p_1$, and $p_2$. Numerals 1, 4, 5, and 6 shown in FIG. 17 are assigned to manage the order of storage in the buffer. Specifically, a plurality of magnetic data managed in the buffer has been stored in corresponding data structures in increasing order of the numerals. Let magnetic data 1, magnetic data 4, magnetic data 5, and magnetic data 6 be a plurality of magnetic data managed with the numerals. Then, a chord of a circular arc passing through the 3 candidate points is a line segment (shown by a dashed line) connecting a point having components corresponding to the magnetic data 1 and another point having components corresponding to the magnetic data 5. It is assumed that the magnetic data 6 is then stored in the buffer. Here, the chord of the circular arc passing through the 3 points having the components of the 3 magnetic data is calculated as the distance between a point having components corresponding to magnetic data stored in the data structure $p_0$ and a point having components corresponding to magnetic data stored in the data structure $p_1$ according to the definition of the data structures $p_0$, $p_1$, and $p_2$. Accordingly, if a point having components corresponding to the magnetic data 6 has a positional relationship as shown in FIG. 17A to the 3 points having components corresponding to the magnetic data 1, 4, and 5, a calculation result that the length of the chord of the circular arc is increased cannot be obtained unless the candidate for selection stored in the data structure $p_0$ is updated. In addition, if the magnetic data 6 has a value which does not increase the length of the chord of the circular arc, the calculation result is that the length of the chord of the circular arc is decreased unless the candidate for selection stored in the data structure $P_2$ is updated and thus there is a need to update the candidate for selection stored in the data structure $p_2$.

Figure 18:
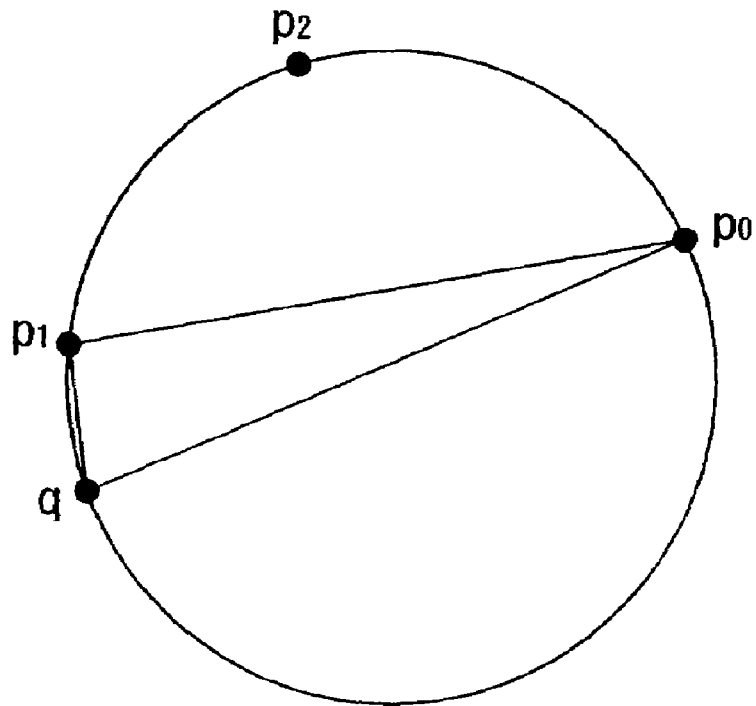
FIG. 18 is a schematic diagram of an embodiment of the present invention.

A condition in which the chord of a circular arc passing through 3 points having components corresponding to 3 magnetic data is lengthened most efficiently and at least is not shortened each time the update is performed is derived in the following manner. Here, let q be the last magnetic data stored in the buffer. Let $p_0$, $p_1$, and $p_2$ magnetic data stored in the data structures. In FIG. 18, points having components corresponding to q, $p_0$, $p_1$, and $p_2$ are shown by filled circles, an orientation circle passing through the 3 points is shown by a solid line. When the magnetic data q increases the length of the chord of the circular arc passing through the 3 candidate points, Inequalities (33) and (34) are true.

$$(q-p_1)\cdot(p_1-p_0) > 0 \quad (33)$$

$$(q-p_0)\cdot(p_1-p_0) < 0 \quad (34)$$

When Inequality (33) is true, the chord can be lengthened by updating $p_1$ with q. When Inequality (34) is true, the chord can be lengthened by updating $p_0$ with q. When any of Inequalities (33) and (34) is not true, the chord is not lengthened.

At step S214, a candidate for selection that has been determined to be updated as described above is updated with the last magnetic data stored in the buffer. As a result, for example, the data structures $p_0$, $p_1$, and $p_2$ in which magnetic data is stored as shown in FIG. 17B are updated as shown in FIG. 17C.

3-Point Selection Conditions

Figure 19:
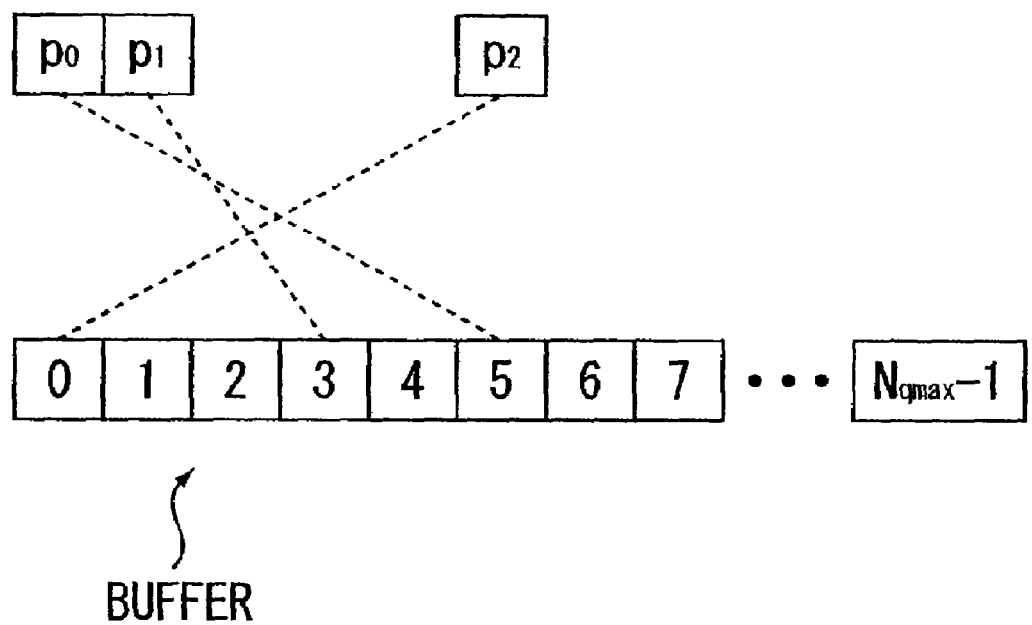
FIG. 19 is a schematic diagram of an embodiment of the present invention.

The selection is performed using all magnetic data stored in the buffer as the candidates for selection of the 3rd point. Here, the buffer is not necessarily filled up. During the procedure in which the 3rd point is selected, magnetic data that has not been determined as any candidate for selection of up to the 2nd point can be sequentially subjected to selection as a candidate for selection of the 3rd point as shown in FIG. 19. Such magnetic data includes magnetic data that has been discarded although it was tentatively determined as a candidate for selection. In FIG. 19, identifiers assigned to magnetic data to manage the order in which the magnetic data is input to the buffer are shown by numerals 0 to $N_{qmax-1}$. As illustrated in FIG. 19, the smaller the numeral is, the earlier the magnetic data stored in the data structure has been input to the buffer.

At step S216, a candidate for selection of the 3rd point is tentatively determined. Specifically, a candidate for selection of the 3rd point is tentatively determined sequentially using a plurality of data stored in the buffer and it is determined whether or not the tentatively determined candidate satisfies one of the 3-point selection conditions (S218). The 3-point selection conditions are derived from two points of view. The first point of view is whether or not 3 points having components corresponding to magnetic data as candidates for selection are sufficiently spread over the circumference of a circle passing through the 3 points, i.e., whether or not a triangle having vertices corresponding to the 3 points is close to a regular triangle. Accordingly, when the selection is performed from the first point of view, the distortion of the triangle having vertices corresponding to the 3 points having components corresponding to the magnetic data as candidates for selection from a regular triangle is calculated. The second point of view is whether or not the area of a circle passing through 3 points having components corresponding to magnetic data as candidates for selection is large enough. When the area of the circle passing through the 3 points is small, the 3 points are distributed over a narrow range on the circumference of an orientation circle passing through the 3 points, and magnetic fields other than those assumed to calculate the correct offset have also been measured. Also when the area of the circle passing through the 3 points is too large, magnetic fields other than those assumed to calculate the correct offset have also been measured. Accordingly, when the selection is performed from the second point of view, the radius of a circle passing through 3 points having components corresponding to magnetic data as candidates for selection is calculated. In the following description, the condition for determination as to whether or not to select the candidates for selection from the first point of view is also referred to as a 3-point selection condition and the determination as to whether or not to select the candidates for selection from the second point of view is also referred to as 3-point selection verification.

First, a description is given of the 3-point selection condition from the first point of view used at step S218. In this embodiment, the distortion of the triangle having vertices corresponding to the 3 points having components corresponding to the magnetic data as candidates for selection from a regular triangle is estimated from eigenvalues of a symmetric matrix of 2 rows and 2 columns expressed using the sum of vectors starting from a centroid $d_3$ of the triangle and ending with the vertices as shown in previous FIG. 10. The centroid $d_3$ of the triangle is obtained from Equation (35).

$$d_3 = \frac{1}{3}(p_0 + p_1 + p_2) \quad (35)$$

The 3-point selection condition derived from the first point of view is that the ratio of the minimum $\lambda_{A2}$ of the eigenvalues $\lambda_{A1}$ and $\lambda_{A2}$ of a symmetric matrix A defined by Equation (36) to the maximum eigenvalue $\lambda_{A1}$ is equal to or greater than a predetermined threshold $E_0$.

$$A = \sum_{i=0}^{2}(p_i - d_3)(p_i - d_3)^T \quad (36)$$

Equation (36) may also be written as Equation (37) using $p_i = (p_{ix}, p_{iy})$, $d_3 = (d_{3x}, d_{3y})$.

$$A = \begin{pmatrix} a_{11} & a_{12} \\ a_{12} & a_{22} \end{pmatrix} \quad (37)$$

Entries of this matrix A are expressed by the following equations.

$$a_{11} = \sum_{i=0}^{2}(p_{ix} - d_{3x})^2 \quad (38)$$

$$a_{12} = \sum_{i=0}^{2}(p_{ix} - d_{3x})(p_{iy} - d_{3y}) \quad (39)$$

$$a_{22} = \sum_{i=0}^{2}(p_{iy} - d_{3y})^2 \quad (40)$$

All the eigenvalues are nonnegative real numbers from the definition of the symmetric matrix A. An estimation $E_A$ defined by Equation (41) is calculated for magnetic data stored in the buffer which has not been selected as any magnetic data of up to the second point and P2 maximizing the estimation $E_A$ is searched for. The 3-point selection condition derived from the first point of view is that the estimation $E_A$ satisfies $E_A \geq E_0$ for the threshold $E_0$. It may also be determined that the 3-point selection condition is satisfied at the moment when the 3rd point satisfying $E_A \geq E_0$ is found.

$$E_A = \frac{\lambda_{A2}}{\lambda_{A1}} \quad (41)$$

The distortion of the triangle having vertices corresponding to the 3 points having components corresponding to the magnetic data as candidates for selection from a regular triangle is defined based on the variation between inner angles of the triangle, the variation between the lengths of the sides of the triangle, the variation between distances of the vertices from the centroid of the triangle, and the like. These variations can be defined by the estimation $E_A$ expressed using the eigenvalues of the symmetric matrix A as described above. Accordingly, the 3-point selection condition derived from the first point of view may also be that the variation between inner angles of a triangle having vertices corresponding to the 3 points having components corresponding to the magnetic data as candidates for selection, the variation between the lengths of the sides of the triangle, or the variation between distances of the vertices from the centroid of the triangle is within a predetermined range. When eigenvalues of the symmetric matrix A are used for determination about the 3-point selection condition, the minimum and maximum eigenvalues of the symmetric matrix A can be obtained as the roots of a quadratic equation. This reduces the amount of calculation compared to when values indicating the variation between inner angles of the triangle, the variation between the lengths of the sides of the triangle, or the variation between distances of the vertices from the centroid of the triangle are used for determination about the 3-point selection condition.

If the 3-point condition derived from the first point of view is not satisfied, it is determined whether or not the determination of all data stored in the buffer has been completed (S220). If the determination of all data stored in the buffer has not been completed, the CPU 40 returns to step S216 to repeat the process for determining whether or not data stored in the buffer satisfies the 3-point selection condition derived from the first point of view. Here, the buffer has not been necessarily filled up. The magnetic data stored in the buffer also includes magnetic data which has not been tentatively determined as any point at either end of the circular arc. If any data stored in the buffer does not satisfy the 3-point selection condition, the CPU 40 returns to step S210 to wait until the buffer is updated because points satisfying the 3-point selection condition have not yet been collected.

Selection Verification

If the 3-point selection condition derived from the first point of view is satisfied, the magnetic data selected from the first point of view is verified from the second point of view (S224). In this process, a radius of a circle passing through the 3 points having components corresponding to the magnetic data as candidates for selection is calculated as described above.

When the center point of the circle is expressed by $c_3=(c_{3x}, c_{3y})$, simultaneous linear equations for obtaining the center point are expressed by Equation (42).

$$\begin{bmatrix} p_{0x} & p_{0y} & 1 \\ p_{1x} & p_{1y} & 1 \\ p_{2x} & p_{2y} & 1 \end{bmatrix} \begin{bmatrix} c_{3x} \\ c_{3y} \\ c_{3r} \end{bmatrix} = \frac{1}{2} \begin{bmatrix} p_{0x}^2 + p_{0y}^2 \\ p_{1x}^2 + p_{1y}^2 \\ p_{2x}^2 + p_{2y}^2 \end{bmatrix} \quad (42)$$

Although there is no need to use the value $c_{3r}$ afterwards, the value is added to establish three linear simultaneous equations. Finally, the radius r is determined as the Euclidean distance between $c_3$ and $p_0$ calculated by Equation (43).

$$r=\|c_3-p_0\|_2 \quad (43)$$

If the radius of the circle passing through the 3 points having components corresponding to the 3 magnetic data satisfying the 3-point selection condition, which has been obtained as described above, is within a range of values $r_{min}$ to $r_{max}$, it is determined that verification of the three point selection is successful. Otherwise, it is determined that verification of the three point selection is unsuccessful and the CPU 40 returns to step S210 to wait until the buffer is updated.

The method may further include the step of determining whether or not the equation of the circle obtained as described above is valid. Specifically, the adequacy of the orientation circle is verified using not only the 3 selected magnetic data $p_0$, $p_1$, and $p_2$ but also all or part of the magnetic data stored in the buffer. This verification is not an indispensable process although it is effective to some degree in reducing the variation of the offset error. In this verification, an estimation S is obtained by Equation (44). If $S>S_t$ for a predetermined threshold $S_t$, the center point of the calculated orientation circle is not adopted as an offset and it is determined that the calibration has failed.

$$S = \frac{1}{N_{qmax}} \frac{1}{r^2} \sum_{q_i \in Q} \{\|q_i - c_3\|_2 - r\}^2 \quad (44)$$

Offset Setting

If the result of the 3-point selection verification is that the 3 selected points are valid, the center point is set as an offset at step S226. Specifically, components of the center point of the calculated orientation circle are set as components of the offset.

In the meantime, while the procedure of steps S210 to S224 is repeated, the estimation $E_A$ is calculated each time step S218 is performed. A table (see FIG. 20) defining the association between estimations $E_A$ and angles corresponding to the central angle of a circular arc passing through 3 points $p_0$, $p_1$, and $p_2$ is previously stored in the ROM 42. Deriving an angle corresponding to the estimation $E_A$ using the table allows the user to be aware of an angle by which the mobile phone 3 including the 2D magnetic sensor 4 has been rotated from the start of calibration, the remaining angle to be rotated to complete the calibration, or the like. Based on the calculated estimation $E_A$, an angle corresponding to the estimation $E_A$ may be derived by the offset setting module and the derived angle may be output to the navigation program 98. Alternatively, each time the estimation $E_A$ is calculated, the estimation $E_A$ may be provided to the navigation program 98 and an angle corresponding to the estimation $E_A$ may be derived by the navigation program 98.

In this embodiment, the central angle of a circular arc passing through 3 points $p_0$, $p_1$, and $p_2$ can be derived even before an offset corresponding to the center point of an orientation circle is calculated, i.e., even during a period in which 3 points required to obtain an accurate offset have not yet been selected. For example, we compare this embodiment with the method in which the offset is obtained using a statistical process. In this method, during a period in which magnetic data as elements of a statistical population used for the statistical process has not been sufficiently collected, an offset corresponding to the center point of the orientation circle is not obtained so that it is not possible to obtain the rotation angle which is the angle by which the mobile phone 3 has been rotated. Even during the period in which the magnetic data has not been sufficiently collected, the rotation angle can be obtained using a tentatively set offset. However, this may reduce the accuracy. In this embodiment, the rotation angle can be derived based on the estimation $E_A$ even during the period in which 3 points satisfying the 3-point selection condition have yet not been selected as described above, so that it is possible to derive the rotation angle with a high accuracy and a small amount of calculation, compared to the method in which an offset, which may not be accurate, is calculated from 3 points not satisfying the 3-point selection condition and the rotation angle is calculated from the positions of $p_0$ and $p_1$ and the calculated offset.

In one method of allowing the user to be aware of the progress, the notification unit 58 may be controlled to generate, for example, a sound of the scale "Do Re Mi Fa Sol La Ti Do" according to the rotation angle. A progress bar may also be displayed on the display 2 according to the estimation $E_A$ to allow the user be aware of the progress. Since the relationship between the rotation angle and the estimation $E_A$ is that the rotation angle increases as the estimation $E_A$ increases, the user may also be informed of the progress as described above according to the estimation $E_A$ without previously storing an association table as shown in FIG. 20 and converting it into an angle.

Also in the following aspects, the offset setting method in this embodiment is more effective than the method in which the offset is obtained using the statistical process. The radius of an orientation circle in places with weak magnetic fields is smaller than that of places with strong magnetic fields. If the last input magnetic data is discarded without being stored in the buffer when the distance between a point having components corresponding to the last input magnetic data and a point having components corresponding to magnetic data immediately before the last input magnetic data is less than a given threshold in order to avoid unevenness or overlapping of the distribution of magnetic data when collecting magnetic data as elements of a statistical population of the statistical process, the number of magnetic data stored in the buffer in places with weak magnetic fields is reduced compared to that of places with strong magnetic fields even when the mobile phone 3 has been rotated through the same range of angles. That is, to collect a sufficient number of magnetic data as a statistical population of the statistical process, it is necessary to rotate the mobile phone 3 through a wider range of angles. In this embodiment, even when the number of magnetic data stored in the buffer is small, it is only necessary to be able to collect points satisfying the 3-point selection condition. Therefore, also in places with weak magnetic fields, this embodiment reduces the number of manipulations of the mobile phone 3 required to collect magnetic data required to calculate the offset and reduces the time required to calculate the offset.

B. SECOND EMBODIMENT

Figure 21:
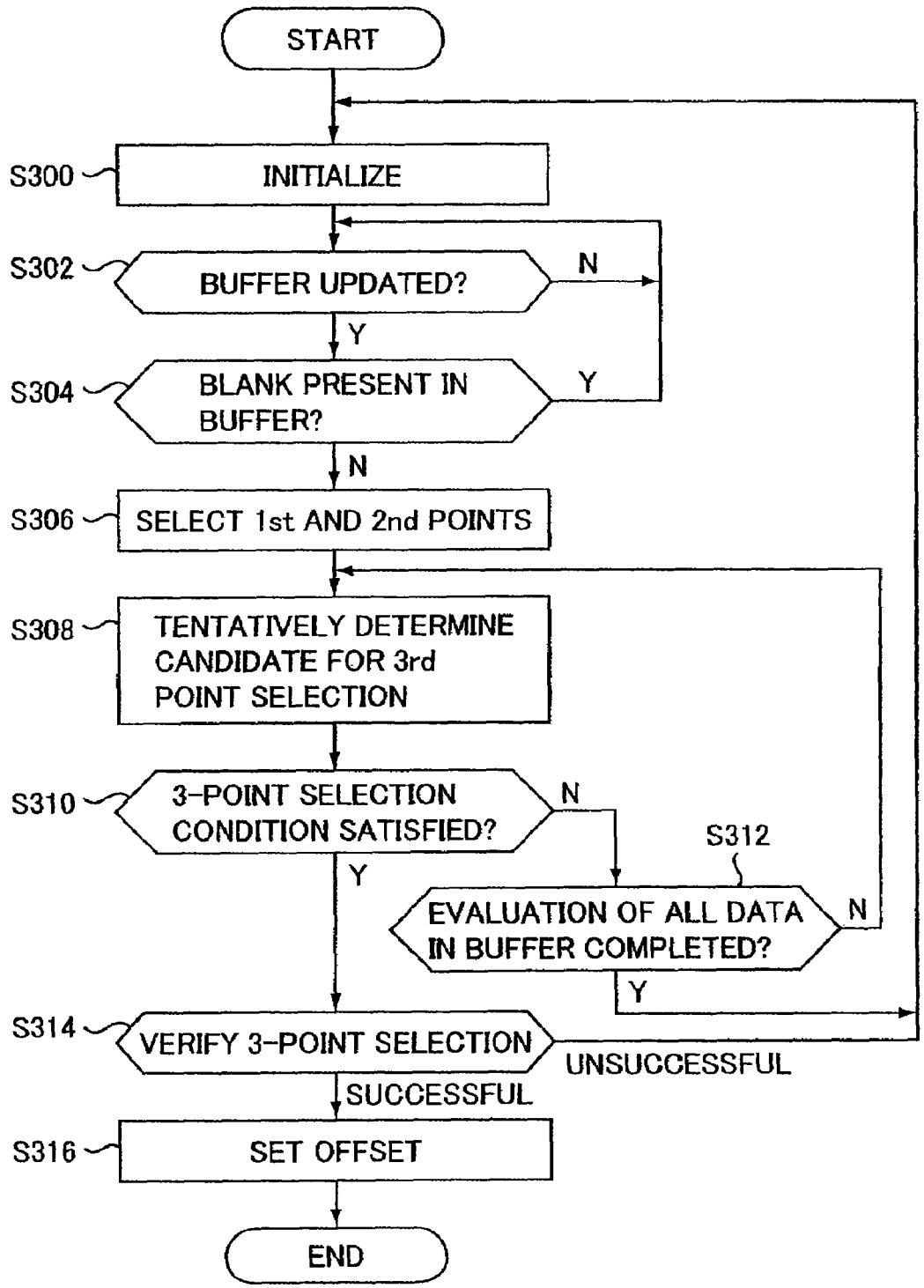
FIG. 21 is a flow chart of an embodiment of the present invention.

FIG. 21 is a flow chart of an offset setting procedure according to the second embodiment of the present invention. The CPU 40 performs the procedure of FIG. 21 by executing the buffer setting module 94 when an offset setting request has been made. In addition, in the same manner as the first embodiment, when a procedure described below is performed by executing the offset setting module 94, the procedure using the buffer management module 92 is performed in parallel in a multitasking environment.

At step S300, initialization is performed to discard all candidates for selection. Specifically, 3 data structures $p_0$, $p_1$, and $p_2$ used to store candidates for selection, which are declared by the offset setting module 94, are reset and the buffer is also initialized.

At step S302, the CPU 40 waits until the buffer is updated.

Once the buffer is updated, it is determined whether or not there is a blank in the buffer, i.e., whether or not the number of data stored in the buffer is a predetermined number $N_{qmax}$ (S304). The procedure of steps S302 and 304 is repeated until the number of data stored in the buffer reaches the predetermined number $N_{qmax}$. In this manner, this embodiment does not select any magnetic data until $N_{qmax}$ magnetic data is stored in the buffer.

Once the $N_{qmax}$ magnetic data is stored in the buffer, magnetic data of the first and second points is selected (S306). A data sequence of $N_{qmax}$ magnetic data stored in the buffer is denoted by "$q_0, q_1, \ldots q_{Nqmax-1}$" and a set of $\{qi|0 \leq i \leq N_{qmax}-1\}$ is denoted by "Q", and points having components corresponding to the magnetic data "$q_0, q_1, \ldots q_{Nqmax-1}$" are then referred to as data points "$q_0, q_1, \ldots q_{Nqmax-1}$" In the same manner as the first embodiment, the magnetic data is stored such that the set Q is not a multiset.

To obtain a highly accurate offset from the set Q of points, it is required that magnetic data corresponding to two points most distant from each other along a specific direction be selected. Selecting two points most distant from each other along a randomly determined direction is very effective on average. The following is a detailed selection method.

Let $p_0$ be a data point $q_i$ which maximizes the inner product D of a vector "a" having a specific direction and magnitude and a vector starting from the centroid $d_N$ of the data points $q_0$, $q_1, \ldots q_{Nqmax-1}$ and ending with each data point and let $p_1$ be a data point $q_i$ which minimizes the inner product D. The centroid $d_N$ of the data points $q_0, q_1, \ldots q_{Nqmax-1}$ is obtained by Equation (45). The inner product D of the vector "a" and the vector starting from the centroid $d_N$ of the data points $q_0$, $q_1, \ldots q_{Nqmax-1}$ and ending with the data point $q_i$ is obtained by Equation (46).

$$d_N = \frac{1}{N_{qmax}} \sum_{q_i \in Q} q_i \tag{45}$$

$$Di = a \cdot (q_i - d_N) \tag{46}$$

$D_i$ is obtained by sequentially substituting elements of the set Q into $q_i$ of Equation (46) and a data point $q_i$ maximizing $D_i$ is set as $p_0$ and a data point $q_i$ minimizing $D_i$ is set as $p_1$, thereby selecting two data points which maximize the distance between feet of perpendiculars dropped from the two data points onto a straight line parallel to the vector "a". In this embodiment, the two selected data points are not replaced with other data points unless the set Q is destroyed. That is, this embodiment sets an offset calculated based on 3 magnetic data which must include the two selected magnetic data.

The above-mentioned vector "a" having a specific direction and magnitude may be the eigenvector of the minimum eigenvalue $\lambda_{C2}$ of the matrix C.

$$C = \sum_{q_i \in Q} (q_i - d_N)(q_i - d_N)^T \tag{47}$$

At step s308, a candidate for selection of the 3rd point is tentatively determined in the same manner as step S216 of the first embodiment.

At step S310, it is determined whether or not the 3-point selection condition is satisfied in the same manner as step S218 of the first embodiment.

At step S312, it is determined whether or not the determination of all data stored in the buffer has been completed in the same manner as step S220 of the first embodiment. If the determination of all data stored in the buffer has not been completed, the CPU 40 returns to step S308.

At step S314, the 3-point selection verification is performed in the same manner as step S224 of the first embodiment. If the result of the 3-point selection verification is that the 3 selected points are invalid, the CPU 40 returns to step S300 to reset the buffer.

At step S316, the offset is set in the same manner as step S226 of the first embodiment.

The present invention is not limited to the above embodiments and can be applied to a variety of embodiments without departing from the spirit of the invention.

What is claimed is:

1. A magnetic sensor control device comprising:
   an input section that inputs a plurality of magnetic data having 3 components sequentially output from a 3-dimensional (3D) magnetic sensor;
   a buffer that stores the plurality of the input magnetic data;
   a selection section that selects 4 magnetic data satisfying a predetermined 4-point selection condition from the plurality of the input magnetic data, wherein the selection section selects (n−1)th magnetic data satisfying a predetermined selection condition before selecting nth (n=2, 3, or 4) magnetic data, then obtains magnetic data, which has not been selected as any of up to the (n−1)th magnetic data, from the buffer, and sets the obtained magnetic data as a candidate for selection of the nth magnetic data;
   a calculation section that calculates a center point equally distant from 4 points each represented by 3 components of a corresponding one of the 4 selected magnetic data; and
   a setting section that sets 3 components representing the center point as an offset of the magnetic data.

2. The magnetic sensor control device according to claim 1, wherein, the selection section has 3 data structures provided for storing 3 number of the input magnetic data as candidates for selection, the selection section updates the 3 data structures until the 3 magnetic data stored in the 3 data structures satisfy a predetermined 3-point selection condition, and selects 3 magnetic data satisfying the 3-point selection condition before selecting the 4th magnetic data based on the 4-point selection condition.

3. The magnetic sensor control device according to claim 2, wherein, when last input magnetic data is stored in one of the 3 data structures, the selection section selects the one data structure, and updates the selected data structure with the last input magnetic data, provided that the length of a chord of a circular arc passing through 3 points corresponding to the 3 magnetic data stored in the 3 data structures is increased or at least is not decreased by updating the one data structure with the last input magnetic data.

4. The magnetic sensor control device according to claim 2, wherein the selection section resets the 3 data structures when the number of times the 3 data structures have been updated with the input magnetic data exceeds a predetermined number of times.

5. The magnetic sensor control device according to claim 2, wherein the 3-point selection condition includes a triangle condition associated with distortion of a concerned triangle relative to a regular triangle, the concerned triangle having vertices specified by 3 points corresponding to the 3 magnetic data stored in the 3 data structures.

6. The magnetic sensor control device according to claim 5, wherein the triangle condition includes a condition that variation between inner angles of the concerned triangle is within a predetermine range.

7. The magnetic sensor control device according to claim 5, wherein the triangle condition includes a condition that variation between lengths of sides of the concerned triangle is within a predetermined range.

8. The magnetic sensor control device according to claim 5, wherein the triangle condition includes a condition that variation between distances of vertices of the concerned triangle from a centroid of the concerned triangle is within a predetermined range.

9. The magnetic sensor control device according to claim 5, wherein the triangle condition includes a condition that the ratio of an intermediate eigenvalue of a symmetric matrix A of 3 rows and 3 columns expressed as follows to a maximum eigenvalue of the symmetric matrix A is equal to or higher than a predetermined value:

$$A = \sum_{i=0}^{2} (p_i - d_3)(p_i - d_3)^T,$$

where $p_i$ (i=0, 1, 2) denotes each vertex of the concerned triangle, T denotes a transposed vector, and $d_3$ denotes a centroid of the concerned triangle.

10. The magnetic sensor control device according to claim 1, wherein the 4-point selection condition includes a tetrahedron condition associated with distortion of a concerned tetrahedron relative to a regular tetrahedron, the concerned tetrahedron having vertices specified by 4 points corresponding to the 4 magnetic data as candidates for selection.

11. The magnetic sensor control device according to claim 10, wherein the tetrahedron condition includes a condition that variation between solid angles of a concerned tetrahedron is within a predetermined range.

12. The magnetic sensor control device according to claim 10, wherein the tetrahedron condition includes a condition that variation between areas of surfaces of the concerned tetrahedron is within a predetermined range.

13. The magnetic sensor control device according to claim 10, wherein the tetrahedron condition includes a condition that variation between distances of vertices of the concerned tetrahedron from a centroid of the concerned tetrahedron is within a predetermined range.

14. The magnetic sensor control device according to claim 10, wherein the tetrahedron condition includes a condition that respective eigenvalue ratios of two sets of eigenvalues included in a plurality of eigenvalues of a symmetric matrix B of 3 rows and 3 columns expressed as follows are higher than respective predetermined values:

$$B = \sum_{i=0}^{3} (p_i - d_4)(p_i - d_4)^T,$$

where $p_i$ (i=0, 1, 2, 3) denotes each vertex of the concerned tetrahedron, T denotes a transposed vector and $d_4$ denotes a centroid of the concerned tetrahedron.

15. The magnetic sensor control device according to claim 1, wherein the selection section selects two magnetic data under the 4-point selection condition, as first and second points, corresponding to two points most distant from each other along a specific direction from the input magnetic data stored in the buffer, and furthermore selects two magnetic data as third and fourth points that have not been selected as the first or second point.

16. The magnetic sensor control device according to claim 15, wherein, the selection section selects concerned magnetic data maximizing D=a·(q−d) as the first point and selects further concerned magnetic data minimizing D=a·(q−d) as the second point, wherein "a" denotes a vector in the specific direction, "d" denotes a position vector of a centroid of points corresponding to the specific number of the input magnetic data stored in the buffer, and "q" denotes a position vector of a point corresponding to concerned magnetic data stored in the buffer.

17. The magnetic sensor control device according to claim 16, wherein an eigenvector corresponding to a minimum eigenvalue of a symmetric matrix C of 3 rows and 3 columns expressed as follows defines the vector in the specific direction:

$$C = \sum_{q_i=Q} (q_i - d_N)(q_i - d_N)^T$$

where Q denotes a set of position vectors $q_i$, $\{q_i | 0 \leq i \leq N-1\}$, T denotes a transposed vector and $d_N$ denotes the position vector of the centroid of the points indicated by the position vectors $q_i$.

18. A magnetic measurement apparatus comprising:

a 3-dimensional (3D) magnetic sensor that sequentially outputs a plurality of magnetic data each having 3 components;

an input section that inputs the plurality of the magnetic data having 3 components sequentially output from the 3-dimensional magnetic sensor;

a buffer that stores the plurality of the input magnetic data;

a selection section that selects 4 magnetic data satisfying a predetermined 4-point selection condition from the plurality of the input magnetic data, wherein the selection section selects (n−1)th magnetic data satisfying a predetermined selection condition before selecting nth (n=2, 3, or 4) magnetic data, then obtains magnetic data, which has not been selected as any of up to the (n−1)th magnetic data, from the buffer, and sets the obtained magnetic data as a candidate for selection of the nth magnetic data;

a calculation section that calculates a center point equally distant from 4 points each represented by 3 components of a corresponding one of the 4 selected magnetic data; and a setting section that sets 3 components representing the center point as an offset of the magnetic data.

19. A computer-implemented method for offset setting for magnetic sensors, the method comprising:

inputting a plurality of magnetic data having 3 components sequentially output from a 3-dimensional (3D) magnetic sensor;

storing the plurality of the input magnetic data in a buffer;

selecting 4 magnetic data satisfying a predetermined 4-point selection condition from the plurality of the input magnetic data, wherein the step of selecting selects (n−1)th magnetic data satisfying a predetermined selection condition before selecting nth (n=2, 3, or 4) magnetic data, then obtains magnetic data, which has not been selected as any of up to the (n−1)th magnetic data, from the buffer, and sets the obtained magnetic data as a candidate for selection of the nth magnetic data;

calculating a center point equally distant from 4 points each represented by 3 components of a corresponding one of the 4 selected magnetic data; and setting 3 components representing the center point as an offset of the magnetic data.

20. A computer-readable recording medium containing an offset setting program for magnetic sensors, the program being executable by a computer to perform a method comprising:

inputting a plurality of magnetic data having 3 components sequentially output from a 3-dimensional (3D) magnetic sensor;

storing the plurality of the input magnetic data in a buffer;

selecting 4 magnetic data satisfying a predetermined 4-point selection condition from the plurality of the input magnetic data, wherein the step of selecting selects (n−1)th magnetic data satisfying a predetermined selection condition before selecting nth (n=2, 3, or 4) magnetic data, then obtains magnetic data, which has not been selected as any of up to the (n−1)th magnetic data, from the buffer, and sets the obtained magnetic data as a candidate for selection of the nth magnetic data;

calculating a center point equally distant from 4 points each represented by 3 components of a corresponding one of the 4 selected magnetic data; and setting 3 components of the center point as an offset of the magnetic data.

* * * * *